US012125157B2

(12) United States Patent
Holz et al.

(10) Patent No.: US 12,125,157 B2
(45) Date of Patent: *Oct. 22, 2024

(54) SAFETY FOR WEARABLE VIRTUAL REALITY DEVICES VIA OBJECT DETECTION AND TRACKING

(71) Applicant: Ultrahaptics IP Two Limited, Bristol (GB)

(72) Inventors: David S. Holz, San Francisco, CA (US); Robert Samuel Gordon, San Francisco, CA (US); Matias Perez, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,455

(22) Filed: Dec. 21, 2022

(65) Prior Publication Data

US 2023/0125265 A1    Apr. 27, 2023

Related U.S. Application Data

(63) Continuation of application No. 16/677,593, filed on Nov. 7, 2019, now Pat. No. 11,538,224, which is a
(Continued)

(51) Int. Cl.
*G06T 19/00* (2011.01)
*G06F 3/00* (2006.01)
(Continued)

(52) U.S. Cl.
CPC ............. *G06T 19/006* (2013.01); *G06F 3/00* (2013.01); *G06F 3/011* (2013.01); *G06V 40/28* (2022.01)

(58) Field of Classification Search
CPC .......... G06T 19/006; G06F 3/00; G06F 3/011; G06V 40/28
See application file for complete search history.

(56) References Cited

U.S. PATENT DOCUMENTS 4,521,831 A    6/1985  Thayer
4,734,939 A    4/1988  Copp
(Continued)

FOREIGN PATENT DOCUMENTS

KR    20130079841 A    7/2013
WO    20090142797 A2   11/2009
WO    2015172118 A1    11/2015

OTHER PUBLICATIONS

Rolland, Jannick P., Richard L. Holloway, and Henry Fuchs. Comparison of optical and video see-through, head-mounted displays. Telemanipulator and Telepresence Technologies. vol. 2351. International Society for Optics and Photonics, 1995. (Year: 1995).
(Continued)

*Primary Examiner* — Daniel F Hajnik
(74) *Attorney, Agent, or Firm* — Haynes Beffel & Wolfeld LLP; Paul A. Durdik; Jason Liao

(57) ABSTRACT

The technology disclosed can provide improved safety by detecting potential unsafe conditions (e.g., collisions, loss of situational awareness, etc.) confronting the user of a wearable (or portable) sensor configured to capture motion and/or determining the path of an object based on imaging, acoustic or vibrational waves. Implementations can enable improved safety to users of virtual reality for machine control and/or machine communications applications using wearable (or portable) devices, e.g., head mounted displays (HMDs), wearable goggles, watch computers, smartphones, and so forth, or mobile devices, e.g., autonomous and semi-autonomous robots, factory floor material handling systems, autonomous mass-transit vehicles, automobiles (human or
(Continued)

machine driven), and so forth, equipped with suitable sensors and processors employing optical, audio or vibrational detection.

19 Claims, 23 Drawing Sheets

Related U.S. Application Data continuation of application No. 16/055,012, filed on Aug. 3, 2018, now Pat. No. 10,475,249, which is a continuation of application No. 15/693,365, filed on Aug. 31, 2017, now Pat. No. 10,043,320, which is a continuation of application No. 14/690,296, filed on Apr. 17, 2015, now Pat. No. 9,754,167.

(60) Provisional application No. 61/981,162, filed on Apr. 17, 2014.

(51) Int. Cl.
*G06F 3/01* (2006.01)
*G06V 40/20* (2022.01)

(56) References Cited

U.S. PATENT DOCUMENTS

| | | | |
|---|---|---|---|
| 5,900,849 A | 5/1999 | Gallery | |
| 7,050,606 B2 | 5/2006 | Paul et al. | |
| D552,152 S | 10/2007 | Almond | |
| 7,289,645 B2 | 10/2007 | Yamamoto et al. | |
| D620,514 S | 7/2010 | Kim et al. | |
| D627,815 S | 11/2010 | Oba | |
| D656,175 S | 3/2012 | Fong | |
| 8,375,473 B2 | 2/2013 | Celona et al. | |
| 8,396,252 B2 | 3/2013 | El Dokor | |
| D689,539 S | 9/2013 | Zaletel et al. | |
| 8,661,571 B1 | 3/2014 | Teetzel et al. | |
| 8,744,645 B1 | 6/2014 | Vaghefinazari et al. | |
| 8,781,171 B2 | 7/2014 | King et al. | |
| D717,361 S | 11/2014 | Nikaido | |
| 8,942,881 B2 | 1/2015 | Hobbs et al. | |
| 9,213,185 B1* | 12/2015 | Starner | G02B 27/017 |
| D756,443 S | 5/2016 | Ju et al. | |
| 11,538,224 B2 | 12/2022 | Holz et al. | |
| 2002/0107637 A1 | 8/2002 | Okamura et al. | |
| 2003/0076996 A1 | 4/2003 | Neumann et al. | |
| 2005/0063564 A1 | 3/2005 | Yamamoto et al. | |
| 2006/0273984 A1 | 12/2006 | Wanda et al. | |
| 2009/0038056 A1 | 2/2009 | Bobbin et al. | |
| 2009/0278915 A1 | 11/2009 | Kramer et al. | |
| 2009/0315837 A1 | 12/2009 | Geiger | |
| 2009/0323121 A1 | 12/2009 | Valkenburg et al. | |
| 2010/0175172 A1 | 7/2010 | Dempsey et al. | |
| 2011/0090252 A1 | 4/2011 | Yoon et al. | |
| 2011/0145981 A1 | 6/2011 | Teetzel et al. | |
| 2011/0239354 A1 | 10/2011 | Celona et al. | |
| 2012/0132682 A1 | 5/2012 | Mongan et al. | |
| 2012/0143361 A1 | 6/2012 | Kurabayashi et al. | |
| 2012/0170800 A1 | 7/2012 | da Silva Frazao et al. | |
| 2012/0194420 A1 | 8/2012 | Osterhout et al. | |
| 2013/0002649 A1 | 1/2013 | Wu et al. | |
| 2013/0127980 A1* | 5/2013 | Haddick | G06F 3/013 348/14.08 |
| 2013/0156296 A1 | 6/2013 | El Dokor | |
| 2013/0204457 A1 | 8/2013 | King et al. | |
| 2013/0261871 A1 | 10/2013 | Hobbs et al. | |
| 2013/0271370 A1 | 10/2013 | Wang et al. | |
| 2013/0278631 A1 | 10/2013 | Border et al. | |
| 2013/0293723 A1 | 11/2013 | Benson et al. | |
| 2013/0300637 A1 | 11/2013 | Smits et al. | |
| 2013/0307856 A1 | 11/2013 | Keane et al. | |
| 2013/0328928 A1 | 12/2013 | Yamagishi et al. | |
| 2013/0335301 A1 | 12/2013 | Wong et al. | |
| 2013/0335573 A1 | 12/2013 | Forutanpour et al. | |
| 2014/0099019 A1 | 4/2014 | El Dokor | |
| 2014/0152809 A1 | 6/2014 | Jarvis | |
| 2014/0189938 A1 | 7/2014 | Redpath et al. | |
| 2014/0306874 A1 | 10/2014 | Finocchio et al. | |
| 2014/0364212 A1* | 12/2014 | Osman | A63F 13/26 463/31 |
| 2014/0375947 A1 | 12/2014 | Park et al. | |
| 2015/0016777 A1 | 1/2015 | Abovitz et al. | |
| 2015/0024368 A1 | 1/2015 | King, Jr. | |
| 2015/0040297 A1 | 2/2015 | Vermillion | |
| 2015/0092015 A1 | 4/2015 | Stafford | |
| 2015/0122855 A1 | 5/2015 | Parsons et al. | |
| 2015/0320189 A1 | 11/2015 | Ju et al. | |
| 2015/0326762 A1 | 11/2015 | Ju et al. | |
| 2015/0351482 A1 | 12/2015 | Gendron et al. | |
| 2015/0366284 A1 | 12/2015 | Dowling et al. | |
| 2016/0044298 A1 | 2/2016 | Holz et al. | |

OTHER PUBLICATIONS

Wikipedia, Affine Transformation, Wikimedia Foundation Inc., Nov. 16, 2021, 8 pages, original access Nov. 25, 2013, <https://en.wikipedia.org/wiki/Affine_transformation>.
Wikipedia, Axis-angle Representation, Wikimedia Foundation Inc., Nov. 29, 2021, 6 pages, original access Jan. 25, 2014, <https://en.wikipedia.org/wiki/Axis%E2%80%93angle_representation>.
Wikipedia, Euclidean Group, Wikimedia Foundation Inc., Jul. 15, 2021, 7 pages, original access Nov. 4, 2013, <https://en.wikipedia.org/wiki/Euclidean_group>.
Wikipedia, Rotation Group SO(3), Wikimedia Foundation Inc., Oct. 19, 2018, 15 pages, original access Jan. 21, 2014, <https://en.wikipedia.org/wiki/rotation_group_SO(3)>.
Wikipedia, Rotation Matrix, Wikimedia Foundation Inc., Jan. 3, 2022, 26 pages, original access Jan. 30, 2014, <https://en.wikipedia.org/wiki/Rotation_matrix>.
Wikipedia, Transformation Matrix, Wikimedia Foundation Inc., Dec. 29, 2021, 10 pages, original access Jan. 28, 2014, <https://en.wikipedia.org/wiki/Transformation_matrix>.

* cited by examiner

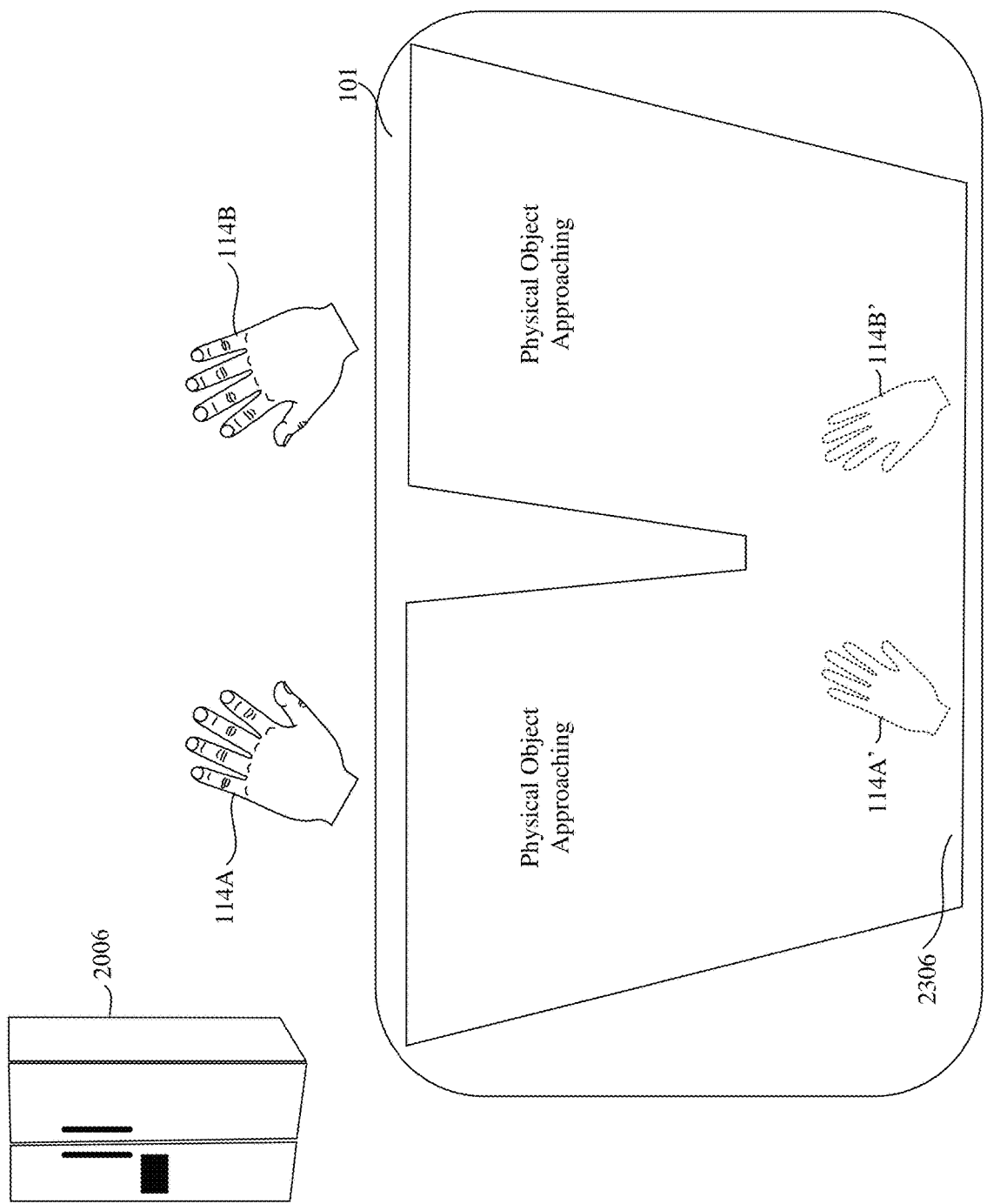

SAFETY FOR WEARABLE VIRTUAL REALITY DEVICES VIA OBJECT DETECTION AND TRACKING

PRIORITY DATA

This application is a continuation of U.S. patent application Ser. No. 16/677,593, filed 7 Nov. 2019, which is a continuation of U.S. patent application Ser. No. 16/055,012, filed 3 Aug. 2018, which is a continuation of U.S. patent application Ser. No. 15/693,365, filed 31 Aug. 2017, which is a continuation of U.S. patent application Ser. No. 14/690,296, entitled, filed 17 Apr. 2015, which claims the benefit of U.S. Provisional Patent Application No. 61/981,162, entitled, filed on 17 Apr. 2014. The provisional and non-provisional applications are hereby incorporated by reference for all purposes.

FIELD OF THE TECHNOLOGY DISCLOSED

The present disclosure relates generally to human machine interface and in particular to improved safety for wearable devices and methods via object detection and tracking.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Conventional motion capture approaches rely on markers or sensors worn by the subject while executing activities and/or on the strategic placement of numerous bulky and/or complex equipment in specialized and rigid environments to capture subject movements. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations have limited the deployment and use of motion capture technology.

Consequently, there is a need for improved safety when using devices having greater portability by capturing the motion of objects in real time without fixed or difficult to configure sensors or markers.

BRIEF DESCRIPTION

Virtual reality (VR) devices are designed to completely get in the way of ones experience of the real world by immersing the users into computer-generated virtual environments. However, such immersive environments can be hazardous to the users because they distract users from and completely block their view of their actual real world surroundings, thus increasing the likelihood of user-collision with nearby objects. As a result, the users have to be always aware of their surroundings, which is a highly error prone expectation that also hurts the overall user experience. This technological drawback in the VR realm is clearly demonstrated by the health and safety warnings found in the product guidelines of leading VR glasses manufactures. Take for example Oculus Rift from Oculus VR®, which comes with the following warning:

"Always be aware of your surroundings when using the headset and remain seated at all times. Take special care to ensure that you are not near other people, objects, stairs, balconies, windows, furniture, or other items that you can bump into or knock down when using—or immediately after using—the headset. Do not handle sharp or otherwise dangerous objects while using the headset. Never wear the headset in situations that require attention, such as walking, bicycling, or driving."[1]

[1] *Oculus VR*, "Appendix L—Health and Safety Warnings," Best Practices Guide, Jan. 9, 2015 version, available at http://static.oculus.com/sdk-downloads/documents/Oculus_Best_Practices_Guide.pdf/.

Accordingly, VR systems and methods are required that provide immersive virtual environments along with safety measures that protect the users without restricting their natural movements and diminishing user-experience.

Implementations of the technology disclosed address these and other problems by providing methods and systems for detecting potential unsafe conditions (e.g., collisions, loss of situational awareness, etc.) confronting the user of a wearable (or portable) sensor configured to capture motion and/or determining the path of an object based on imaging, acoustic or vibrational waves. Implementations can enable improved safety to users of virtual reality for machine control and/or machine communications applications using wearable (or portable) devices, e.g., head mounted displays (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection.

In one implementation, a wearable sensor system includes capabilities to detect a potentially dangerous condition confronting a user of a virtual reality device. For example, one type of potentially dangerous condition includes detecting a potential collision between the user of the device and a physical object in the real world. Another potentially dangerous condition is a loss of situational awareness—e.g., the device is unable to determine from received information (e.g., images, sensor data) a state of the world. Such situational awareness loss can arise from as one or more of insufficient information or conflicting information about a scene that renders the device incapable of determining a state for the world. Insufficient or incomplete information can arise from an occurrence of one or more of: (i) a condition (or conditions) limiting the device's sensors' abilities (e.g., lighting, obscurations, reflections, etc.); (ii) equipment failure or malfunction; or (iii) conditions not otherwise specified that are unable to be recognized by the software/hardware of the virtual reality device. Situational awareness loss can manifest in a potentially dangerous total or partial loss of perception of the real world by the device. Accordingly, by employing the techniques described herein, the device is capable of responding to reduce the danger.

For example, in one implementation, the device responds to reduce the danger by virtualizing the physical object posing the danger of collision into the virtual reality displayed to the user. Another response includes raising a warning to the user. A yet further response includes entering a pass-through mode in which live video is displayed to the user instead of the virtual reality presentation.

In one implementation, the detecting includes capturing a sequence of images. Features in the images corresponding to objects in the real world can be detected. The features of the objects are correlated across multiple images to determine change, which can be represented as a flow. The flow can be used to determine a relative motion between the wearable device and the objects in the real world. In implementations, the flow can include a vector field, a probabilistic representation, other flow representations, or combinations thereof.

In one implementation, a wearable sensor system includes capabilities to autonomously create a map of an environment surrounding a user of a virtual reality device. The map can be advantageously employed to track hazards, objects, opportunities, or other points potentially of interest. One method includes capturing a plurality of images. A flow can be determined from features identified in captured images. (For example, features in the images corresponding to objects in the real world can be detected. The features of the objects are correlated across multiple images to determine change, which can be represented as a flow.) Based at least in part upon that flow, a map of the environment can be created. The method also includes localizing a user in the environment using the map. Advantageously, processing time can be reduced when a user enters a previously visited portion of the environment, since the device needs to scan for new or changed conditions (e.g., that might present hazards, opportunities or points of interest). In one implementation, once a map of the environment has been built, the map can be presented to a virtualizing (VR) system and the virtualizing system can use the map as constraint(s) upon which to construct its virtual world. Accordingly, by employing such techniques, a VR system can keep the user from getting anywhere near hazards (e.g., walls, tables) indicated by the map. Dynamic hazards (e.g., swinging doors, shots fired, etc.) can be monitored for separately.

In one implementation, described is a method of detecting an imminent collision with a physical object during a virtual reality experience. The method includes using at least one forward facing camera mounted to a head mounted virtual reality device (HMVRD) to capture a sequence of images of a real world environment ahead of a user wearing the HMVRD. It also includes using features in the images to track proximity of at least one physical object ahead of the user and correlating multiple images to detect relative motion between at least one approaching physical object and the user. The method further includes responsive to detecting the approaching physical object within a proximity threshold, automatically generating an alert to be injected into a virtual reality experience of the user.

In one implementation, automatically generating the alert further includes generating data that represents the approaching physical object in a virtual environment of the HMVRD.

In another implementation, a pass through mode is entered that interrupts the virtual reality experience and substitutes a live feed of the real world environment in a virtual environment of the HMVRD.

In yet another implementation, automatically generating the alert further includes generating a physical warning feedback. In some implementations, the physical warning feedback is a haptic feedback. In other implementations, the physical warning feedback is an audio message generated by the HMVRD. In yet other implementations, the physical warning feedback is a visual feedback generated in a virtual environment of the HMVRD.

The method further includes integrating the real world environment with an HMVRD. It includes, at a first time t0, using a sensor attached to the HMVRD, sensing a first position of at least one physical object in a first reference frame of the real world environment, including tracking portions of the physical object. It also includes causing display of a first virtual representation of the physical object at the first position, wherein the first virtual representation is rendered in a virtual environment of the HMVRD. The method further includes, at a second time t1, sensing, in the real world environment, a second position of the physical object and at least some of the portions different from the first position responsive to repositioning of the real world environment and the attached sensor due to body movement of the user, wherein the physical object has not moved in the real world environment between t0 and t1. Further, it includes causing display of a second virtual representation of the physical object at an actual second position.

Causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame. In one implementation, the common reference frame has a fixed point of reference and an initial orientation of axes, whereby the sensed second position is transformed to the actual second position.

In some implementations, the common reference frame is a world reference frame that does not change as the attached sensor is repositioned. In other implementations, the common reference frame is the second reference frame.

In some implementations, the transforming the first and second positions of the physical object into the common reference frame further includes applying an affine transformation.

The method includes determining the orientation of the physical object at the first position with respect to the first reference frame and causing the display of the physical object accordingly.

The method also includes determining the orientation of the physical object at the second position with respect to the second reference frame and causing the display of the physical object accordingly.

The method includes using features in the images to distinguish among different approaching physical objects in the real world environment.

The method also includes using features in the images to distinguish among different perspectives of a particular approaching physical object from varying vantage points of the forward facing camera.

In some implementations, using features in the images to track proximity of at least one physical object ahead of the user further includes detecting at least one difference between the features between times t0 and t1 using at least one of a vector field flow and probabilistic flow.

In another implementation, method of detecting an imminent collision with a physical object during a virtual reality experience is described. The method includes using at least one camera coupled to a virtual reality device to capture a sequence of images of a real world environment near the virtual reality device in use. It also includes correlating multiple images to detect relative motion between the virtual reality device and at least one approaching physical object. It further includes responsive to detecting the approaching physical object within a proximity threshold, automatically signaling the virtual reality device to generate an alert to a user of the virtual reality device.

In yet another implementation, described is a method of efficiently detecting an imminent collision with a physical object during a virtual reality experience. The method includes creating a virtual three-dimensional (3D) map of a real world environment surrounding a user of a virtual reality device using at least one camera coupled to the virtual reality device that captures a sequence of images of the real world environment. It includes using features in the images to detect positions and shapes of one or more physical objects in the real world environment and incorporating the detected physical objects as 3D constraints in the 3D map, wherein the 3D constraints represent actual positions and shapes of the physical objects in the real world environment. The method also includes localizing a position of the virtual reality device in the real world environment. The method further includes responsive to detecting an approaching 3D constraint within a proximity threshold of the user using the virtual reality device, automatically signaling the virtual reality device to generate an alert to the user.

In one implementation, automatically generating the alert further includes generating data that represents the approaching physical object in a virtual environment of the HMVRD.

In another implementation, automatically generating the alert further includes entering a pass through mode that interrupts the virtual reality experience and substitutes a live feed of the real world environment in a virtual environment of the HMVRD.

In yet another implementation, automatically generating the alert further includes generating a physical warning feedback. In some implementations, the physical warning feedback is a haptic feedback. In other implementations, the physical warning feedback is an audio message generated by the HMVRD. In yet other implementations, the physical warning feedback is a visual feedback generated in a virtual environment of the HMVRD.

In one implementation, motion sensors and/or other types of sensors are coupled to a motion-capture system to monitor motion of at least the sensor of the motion-capture system resulting from, for example, users' touch. Information from the motion sensors can be used to determine first and second positional information of the sensor with respect to a fixed point at first and second times. Difference information between the first and second positional information is determined. Movement information for the sensor with respect to the fixed point is computed based upon the difference information. The movement information for the sensor is applied to apparent environment information sensed by the sensor to remove motion of the sensor therefrom to yield actual environment information; which can be communicated. Control information can be communicated to a system configured to provide a virtual reality or augmented reality experience via a portable device and/or to systems controlling machinery or the like based upon motion capture information for an object moving in space derived from the sensor and adjusted to remove motion of the sensor itself. In some applications, a virtual device experience can be augmented by the addition of haptic, audio and/or visual projectors.

In an implementation, apparent environmental information is captured from positional information of an object portion at the first time and the second time using a sensor of the motion-capture system. Object portion movement information relative to the fixed point at the first time and the second time is computed based upon the difference information and the movement information for the sensor.

In further implementations, a path of the object is calculated by repeatedly determining movement information for the sensor, using the motion sensors, and the object portion, using the sensor, at successive times and analyzing a sequence of movement information to determine a path of the object portion with respect to the fixed point. Paths can be compared to templates to identify trajectories. Trajectories of body parts can be identified as gestures. Gestures can indicate command information to be communicated to a system. Some gestures communicate commands to change operational modes of a system (e.g., zoom in, zoom out, pan, show more detail, next display page, and so forth).

Advantageously, some implementations can enable greater safety for users of virtual reality wearable devices. Some implementations further provide gesture capability allowing the user to execute intuitive gestures involving virtualized contact with a virtual object. For example, a device can be provided a capability to distinguish motion of objects from motions of the device itself in order to facilitate proper gesture recognition. Some implementations can provide improved interfacing with a variety of portable or wearable machines (e.g., smart telephones, portable computing systems, including laptop, tablet computing devices, personal data assistants, special purpose visualization computing machinery, including heads up displays (HUD) for use in aircraft or automobiles for example, wearable virtual and/or augmented reality systems, including Google Glass, and others, graphics processors, embedded microcontrollers, gaming consoles, or the like; wired or wirelessly coupled networks of one or more of the foregoing, and/or combinations thereof), obviating or reducing the need for contact-based input devices such as a mouse, joystick, touch pad, or touch screen. Some implementations can provide for improved interface with computing and/or other machinery than would be possible with heretofore known techniques. In some implementations, a richer human—machine interface experience can be provided.

Other aspects and advantages of the present technology can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the disclosed technology. In the following description, various implementations of the technology disclosed are described with reference to the following drawings, in which:

FIG. 23 shows one implementation of automatically generating an alert to be injected into a virtual reality experience of a user of an HMVRD.

DETAILED DESCRIPTION

Among other aspects, the technology described herein with reference to example implementations can provide for automatically (e.g., programmatically) detecting potential unsafe conditions (e.g., collisions, loss of situational awareness, etc.) confronting the user of a wearable (or portable) sensor configured to capture motion and/or determining the path of an object based on imaging, acoustic or vibrational waves. Implementations can enable improved safety to users of virtual reality for machine control and/or machine communications applications using wearable (or portable) devices, e.g., head mounted displays (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection. In some implementations, projection techniques can supplement the sensory based tracking with presentation of virtual (or virtualized real) objects (visual, audio, haptic, and so forth) created by applications loadable to, or in cooperative implementation with, the HMD or other device to provide a user of the device with a personal virtual experience (e.g., a functional equivalent to a real experience).

Some implementations include detecting potential collision with real world objects using e.g., optical image sensing. For example, a sequence of images can be correlated to construct a 3-D model(s) of real world object(s), including position and shape. A succession of images can be analyzed using the same technique to model motion of the object such as free-form gestures. When potential collisions with real world objects are detected, the system can respond in one or more ways. For example, the system can enter a "pass-through" mode in which live video is substituted for virtual reality, enabling the user to perceive the imminent danger directly. In another example, a warning can be raised to the user of the potentially dangerous condition. In a yet further example, the potentially dangerous condition is virtualized and added to the virtual reality being displayed to the user. Combinations of these and other techniques can be used. In low-light or other situations not conducive to optical imaging, where free-form gestures cannot be recognized optically with a sufficient degree of reliability, audio signals or vibrational waves can be detected and used to supply the direction and location of the object as further described herein.

Figure 1:
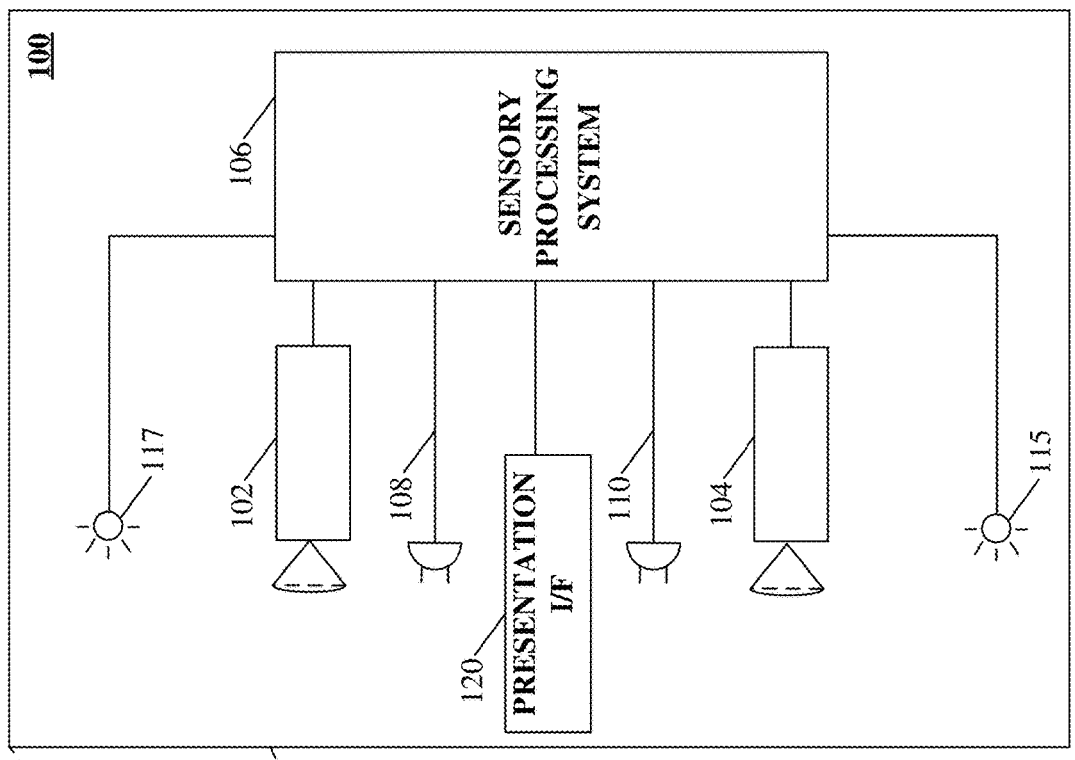
FIG. 1 illustrates a system for capturing image and other sensory data according to an implementation of the technology disclosed.
Figure 1:
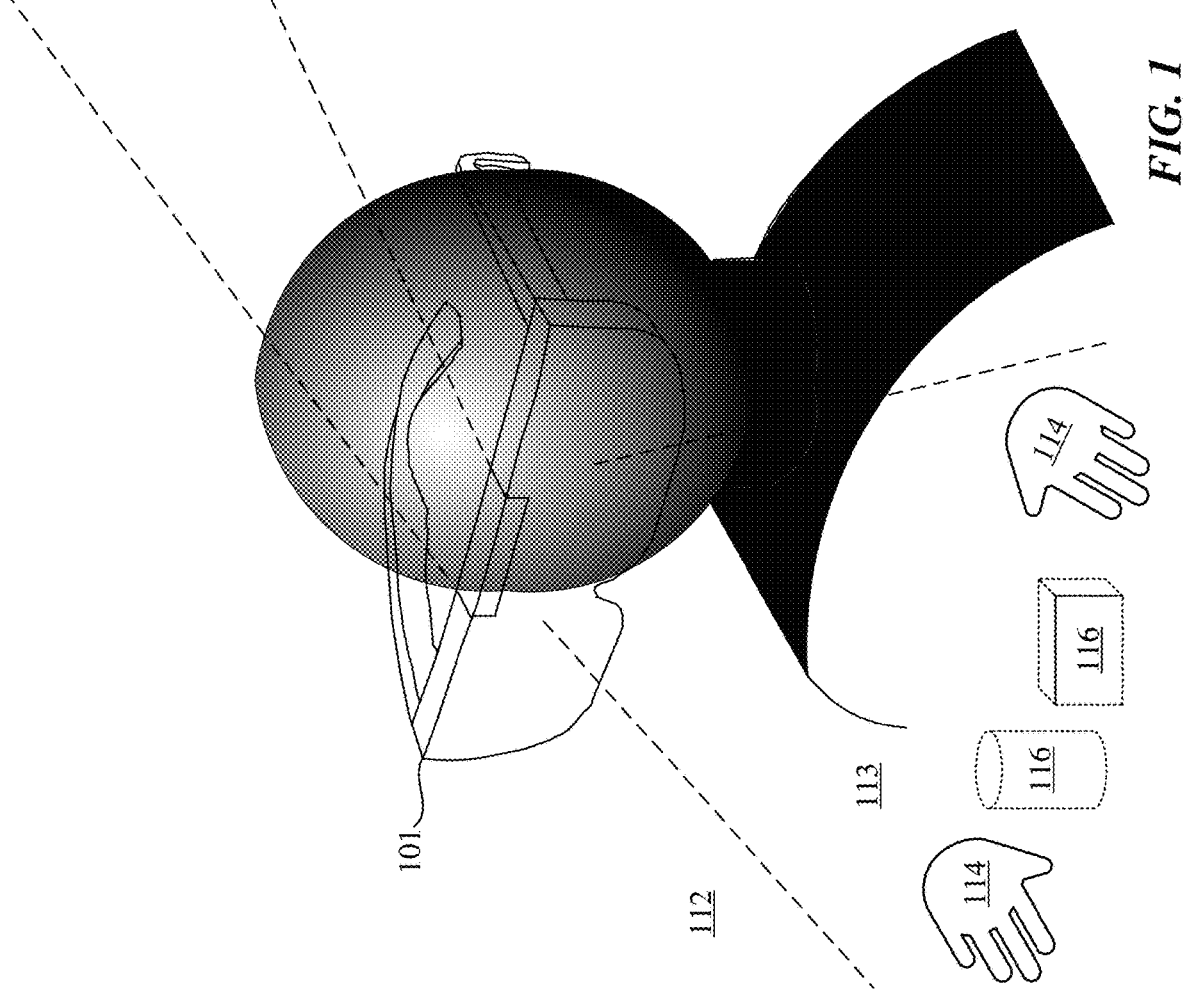

Refer first to FIG. 1, which illustrates a system 100 for capturing image data according to one implementation of the technology disclosed. System 100 is preferably coupled to a wearable device 101 that can be a personal head mounted display (HMD) having a goggle form factor such as shown in FIG. 1, a helmet form factor, or can be incorporated into or coupled with a watch, smartphone, or other type of portable device. System 100 includes any number of cameras 102, 104 coupled to sensory processing system 106. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second), although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 102, 104 can be oriented toward portions of a region of interest 112 by motion of the device 101, in order to view a virtually rendered or virtually augmented view of the region of interest 112 that can include a variety of virtual objects 116 as well as contain an object of interest 114 (in this example, one or more hands) moves within the region of interest 112. One or more sensors 108, 110 capture motions of the device 101. In some implementations, one or more light sources 115, 117 are arranged to illuminate the region of interest 112. In some implementations, one or more of the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 106, which can be, e.g., a computer system, can control the operation of cameras 102, 104 to capture images of the region of interest 112 and sensors 108, 110 to capture motions of the device 101. Information from sensors 108, 110 can be applied to models of images taken by cameras 102, 104 to cancel out the effects of motions of the device 101, providing greater accuracy to the virtual experience rendered by device 101. Based on the captured images and motions of the device 101, sensory processing system 106 determines the position and/or motion of object 114.

For example, as an action in determining the motion of object 114, sensory processing system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 and cancelling out captured motions of the device 101 from sensors 108, 110 allows sensory processing system 106 to determine the location in 3D space of object 114, and analyzing sequences of images allows sensory processing system 106 to reconstruct 3D motion of object 114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 120 employs projection techniques in conjunction with the sensory based tracking in order to present virtual (or virtualized real) objects (visual, audio, haptic, and so forth) created by applications loadable to, or in cooperative implementation with, the device 101 to provide a user of the device with a personal virtual experience. Projection can include an image or other visual representation of an object.

Figure 8:
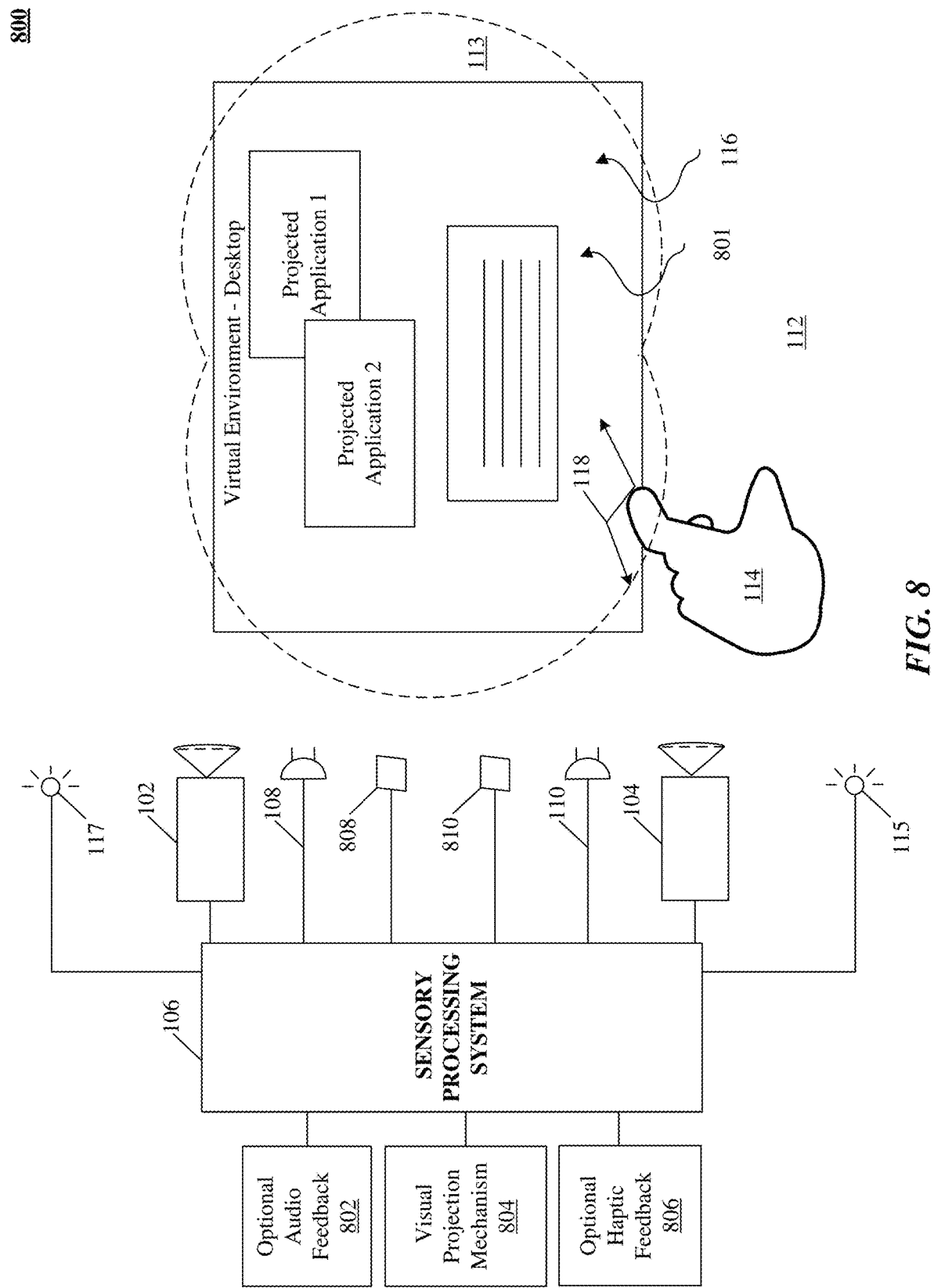
FIG. 8 illustrates one implementation of a system for providing a virtual device experience.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging 102, 104 or acoustic or other sensory devices. Control information is communicated to a system based in part on a combination of the motion of the portable device 101 and the detected motion of the user determined from the sensory information received from imaging 102, 104 or acoustic or other sensory devices. The virtual device experience can be augmented in some implementations by the addition of haptic, audio and/or other sensory information projectors. For example, with reference to FIG. 8, optional video projector 804 can project an image of a page (e.g., virtual device 801) from a virtual book object superimposed upon a desk (e.g., surface portion 116) of a user; thereby creating a virtual device experience of reading an actual book, or an electronic book on a physical e-reader, even though no book nor e-reader is present. Optional haptic projector 806 can project the feeling of the texture of the "virtual paper" of the book to the reader's finger. Optional audio projector 802 can project the sound of a page turning in response to detecting the reader making a swipe to turn the page. Because it is a virtual reality world, the back side of hand 114 is projected to the user, so that the scene looks to the user as if the user is looking at the user's own hand(s).

A plurality of sensors 108, 110 coupled to the sensory processing system 106 to capture motions of the device 101. Sensors 108, 110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 100 can include any of various other sensors not shown in FIG. 1 for clarity, alone or in various combinations, to enhance the virtual experience provided to the user of device 101. For example, in low-light situations where free-form gestures cannot be recognized optically with a sufficient degree of reliability, system 106 may switch to a touch mode in which touch gestures are recognized based on acoustic or vibrational sensors. Alternatively, system 106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 106 from a standby mode to an operational mode. For example, the system 106 may enter the standby mode if optical signals from the cameras 102, 104 are absent for longer than a threshold interval.

It will be appreciated that the figures shown in FIG. 1 are illustrative. In some implementations, it may be desirable to house the system 100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Figure 2:
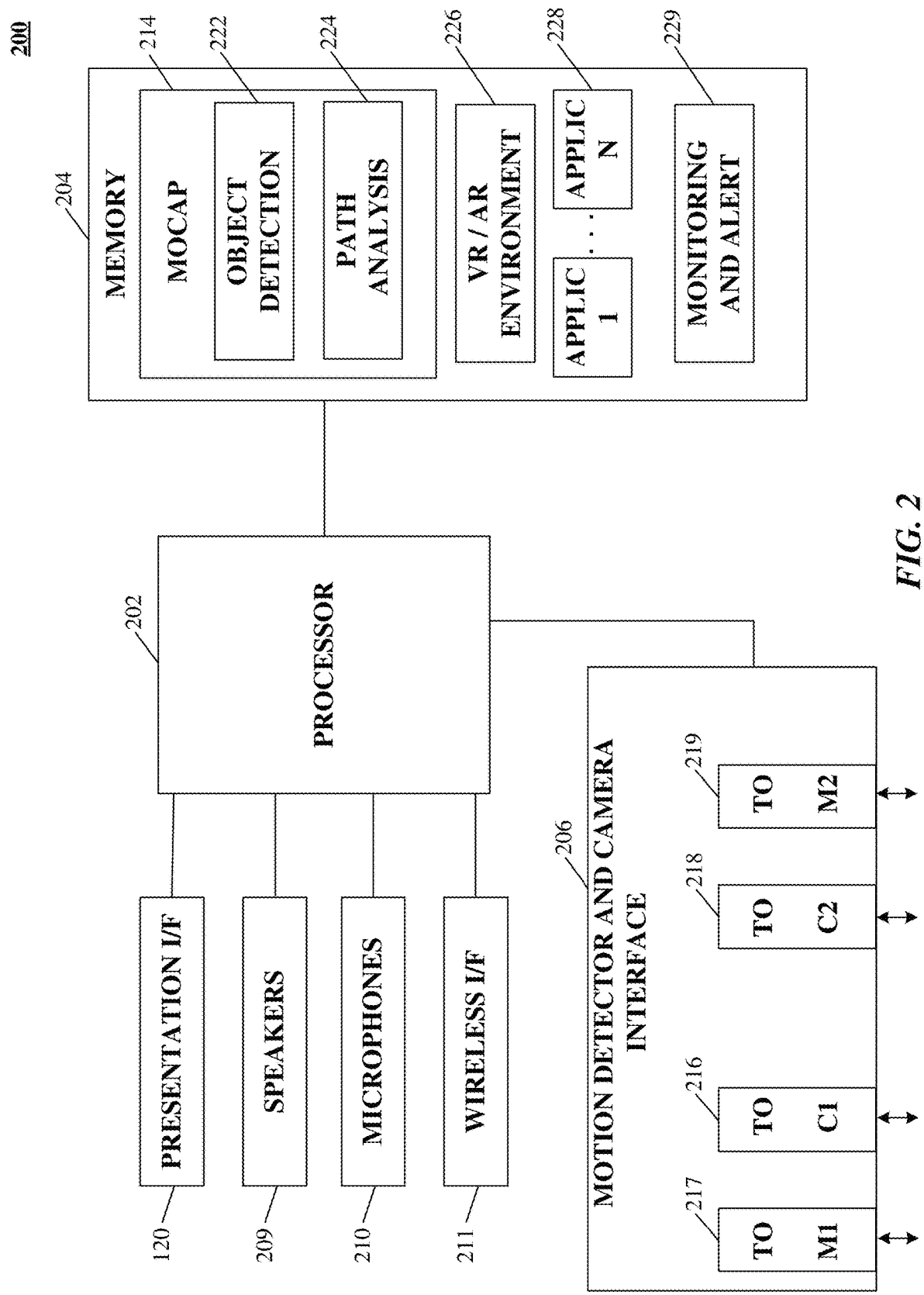
FIG. 2 is a simplified block diagram of a computer system implementing image analysis suitable for supporting a virtual environment enabled apparatus according to an implementation of the technology disclosed.

Refer now to FIG. 2, which shows a simplified block diagram of a computer system 200 for implementing sensory processing system 106. Computer system 200 includes a processor 202, a memory 204, a motion detector and camera interface 206, a presentation interface 120, speaker(s) 209, a microphone(s) 210, and a wireless interface 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPEN-ACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Motion detector and camera interface 206 can include hardware and/or software that enables communication between computer system 200 and cameras 102, 104, as well as sensors 108, 110 (see FIG. 1). Thus, for example, motion detector and camera interface 206 can include one or more camera data ports 216, 218 and motion detector ports 217, 219 to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a motion-capture ("mocap") program 214 executing on processor 202. In some implementations, motion detector and camera interface 206 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 202, which may in turn be generated in response to user input or other detected events.

Instructions defining mocap program 214 are stored in memory 204, and these instructions, when executed, perform motion-capture analysis on images supplied from cameras and audio signals from sensors connected to motion detector and camera interface 206. In one implementation, mocap program 214 includes various modules, such as an object analysis module 222 and a path analysis module 224. Object analysis module 222 can analyze images (e.g., images captured via interface 206) to detect edges of an object therein and/or other information about the object's location. In some implementations, object analysis module 222 can also analyze audio signals (e.g., audio signals captured via interface 206) to localize the object by, for example, time distance of arrival, multilateration or the like. ("Multilateration is a navigation technique based on the measurement of the difference in distance to two or more stations at known locations that broadcast signals at known times. See Wikipedia, at <http://en.wikipedia.org/w/index.php?title=Multilateration&oldid=523281858>, on Nov. 16, 2012, 06:07 UTC). Path analysis module 224 can track and predict object movements in 3D based on information obtained via the cameras. Some implementations will include a Virtual Reality/Augmented Reality environment manager 226 provides integration of virtual objects reflecting real objects (e.g., hand 114) as well as synthesized objects 116 for presentation to user of device 101 via presentation interface 120 to provide a personal virtual experience. One or more applications 228 can be loaded into memory 204 (or otherwise made available to processor 202) to augment or customize functioning of device 101 thereby enabling the system 200 to function as a platform. Successive camera images are analyzed at the pixel level to extract object movements and velocities. Audio signals place the object on a known surface, and the strength and variation of the signals can be used to detect object's presence. If both audio and image information is simultaneously available, both types of information can be analyzed and reconciled to produce a more detailed and/or accurate path analysis. A monitoring and alert engine 229 provides response(s) to potentially hazardous conditions using techniques like that of flowchart 1100 of FIG. 11.

Presentation interface 120, speakers 209, microphones 210, and wireless network interface 211 can be used to facilitate user interaction via device 101 with computer system 200. These components can be of generally conventional design or modified as desired to provide any type of user interaction. In some implementations, results of motion capture using motion detector and camera interface 206 and mocap program 214 can be interpreted as user input. For example, a user can perform hand gestures or motions across a surface that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed to the user of device 101 via presentation interface 120, to use rotating gestures to increase or decrease the volume of audio output from speakers 209, and so on. Path analysis module 224 may represent the detected path as a vector and extrapolate to predict the path, e.g., to improve rendering of action on device 101 by presentation interface 120 by anticipating movement.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object analysis module 222 by processor 202 can cause processor 202 to operate motion detector and camera interface 206 to capture images and/or audio signals of an object traveling across and in contact with a surface to detect its entrance by analyzing the image and/or audio data.

Figure 3A:
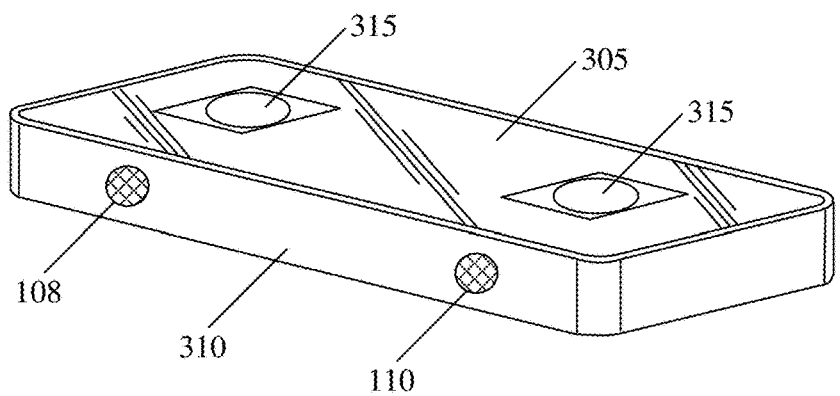
FIG. 3A is a perspective view from the top of a sensor in accordance with the technology disclosed, with motion sensors along an edge surface thereof.
Figure 3B:
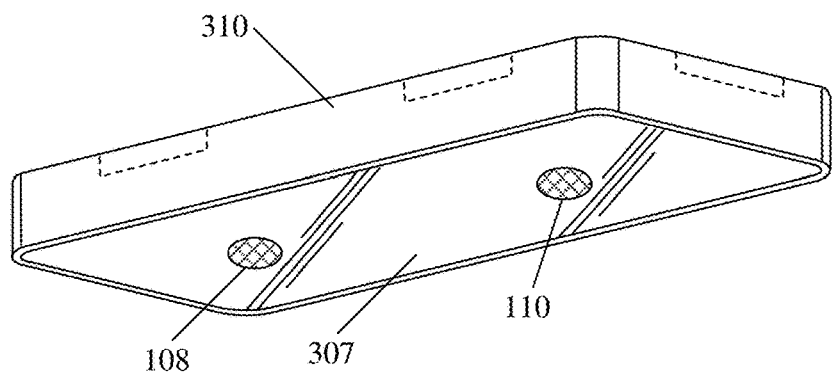
FIG. 3B is a perspective view from the bottom of a sensor in accordance with the technology disclosed, with motion sensors along the bottom surface thereof.
Figure 3C:
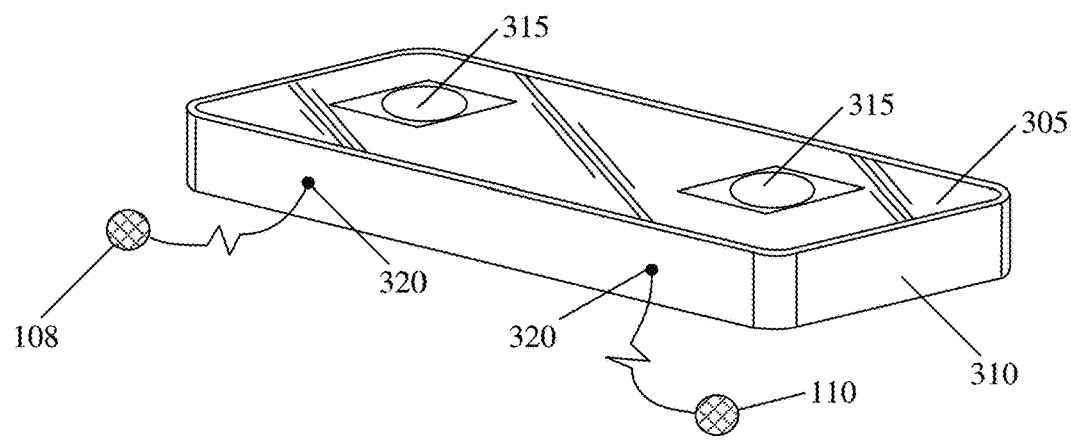
FIG. 3C is a perspective view from the top of a sensor in accordance with the technology disclosed, with detachable motion sensors configured for placement on a surface.

FIGS. 3A, 3B, and 3C illustrate three different configurations of a movable sensor system 300A-C, with reference to example implementations packaged within a single housing as an integrated sensor. In all cases, sensor 300A, 300B, 300C includes a top surface 305, a bottom surface 307, and a side wall 310 spanning the top and bottom surfaces 305, 307. With reference also to FIG. 3A, the top surface 305 of sensor 300A contains a pair of windows 315 for admitting light to the cameras 102, 104, one of which is optically aligned with each of the windows 315. If the system includes light sources 115, 117, surface 305 may contain additional windows for passing light to the object(s) being tracked. In sensor 300A, motion sensors 108, 110 are located on the side wall 310. Desirably, the motion sensors are flush with the surface of side wall 310 so that, the motion sensors are disposed to sense motions about a longitudinal axis of sensor 300A. Of course, the motion sensors can be recessed from side wall 310 internal to the device in order to accommodate sensor operation and placement within available packaging space so long as coupling with the external housing of sensor 300A remains adequate. In sensor 300B, motion sensors 108, 110 are located proximate to the bottom surface 307, once again in a flush or recessed configuration. The top surface of the sensor 300B (not shown in the figure for clarity sake) contains camera windows 315 as shown in FIG. 3A. In FIG. 3C, motion sensors 108, 110 are external contact transducers that connect to sensor 300C via jacks 320. This configuration permits the motion sensors to be located away from the sensor 300C, e.g., if the motion sensors are desirably spaced further apart than the packaging of sensor 300C allows. In other implementations, movable sensor components of FIG. 2 can be imbedded in portable (e.g., head mounted displays (HMDs), wearable goggles, watch computers, smartphones, and so forth) or movable (e.g., autonomous robots, material transports, automobiles (human or machine driven)) devices.

Figure 4:
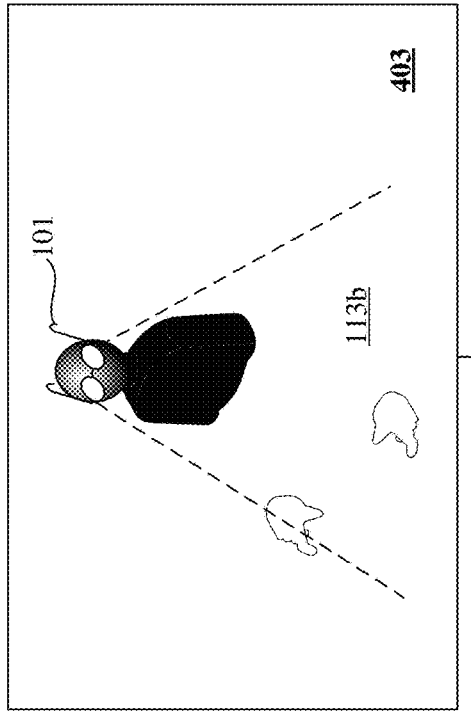
FIG. 4 illustrates apparent movement of objects from the perspective of the user of a virtual environment enabled apparatus in accordance with the technology disclosed.
Figure 4:
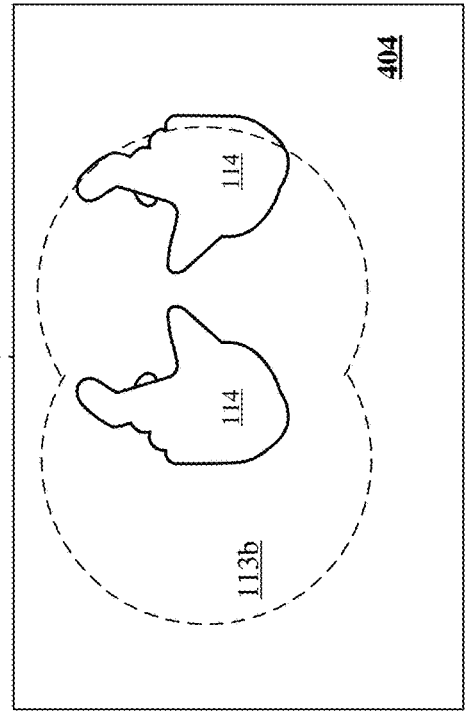
Figure 4:
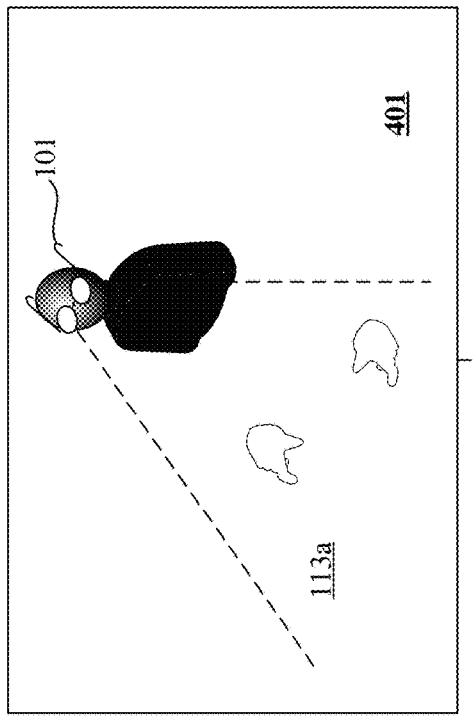
Figure 4:
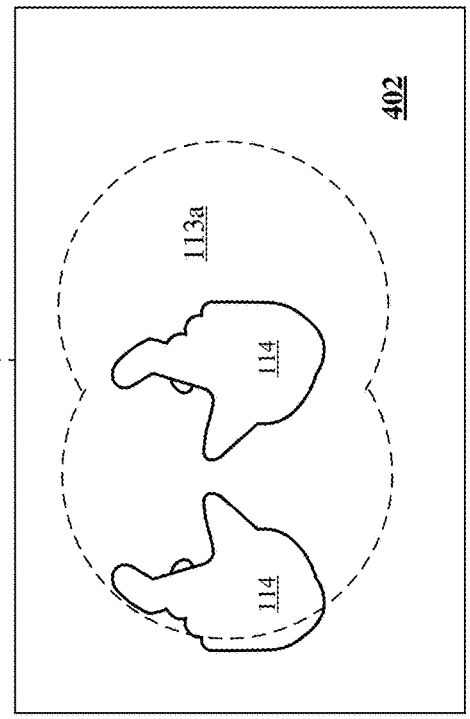

FIG. 4 illustrates apparent movement of objects from the perspective of the user of a virtual environment enabled apparatus 400 in accordance with the technology. FIG. 4 shows two views of a user of a device 101 viewing a field of view 113 at two different times. As shown in block 401, at an initial time $t_0$, user is viewing field of view 113a using device 101 in a particular initial position to view an area 113a. As shown in block 402, device 101 presents to user a display of the device field of view 113a that includes objects 114 (hands) in a particular pose. As shown in block 403, subsequently at time $t_1$, the user has repositioned device 101. Accordingly, the apparent position of objects 114 in the field of view 113b shown in block 404 has changed from the apparent position of the objects 114 in field of view 113a. Even in the case where the hands 114 did not move in space, the user sees an apparent movement of the hands 114 due to the change in position of the device.

Figure 5:
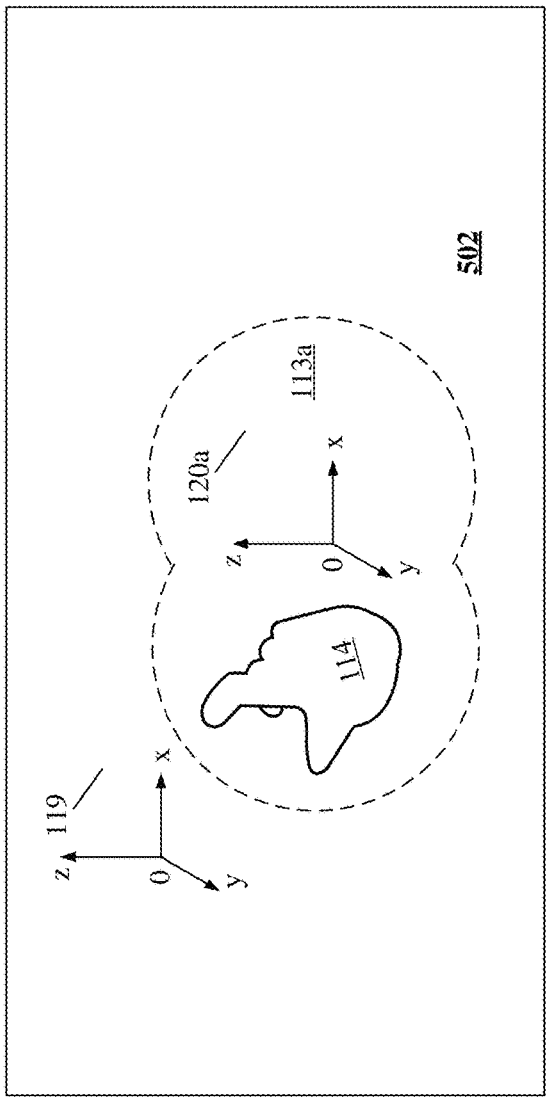
FIG. 5 illustrates apparent movement of objects from the perspective of the user of a virtual environment enabled apparatus in accordance with the technology disclosed.
Figure 5:
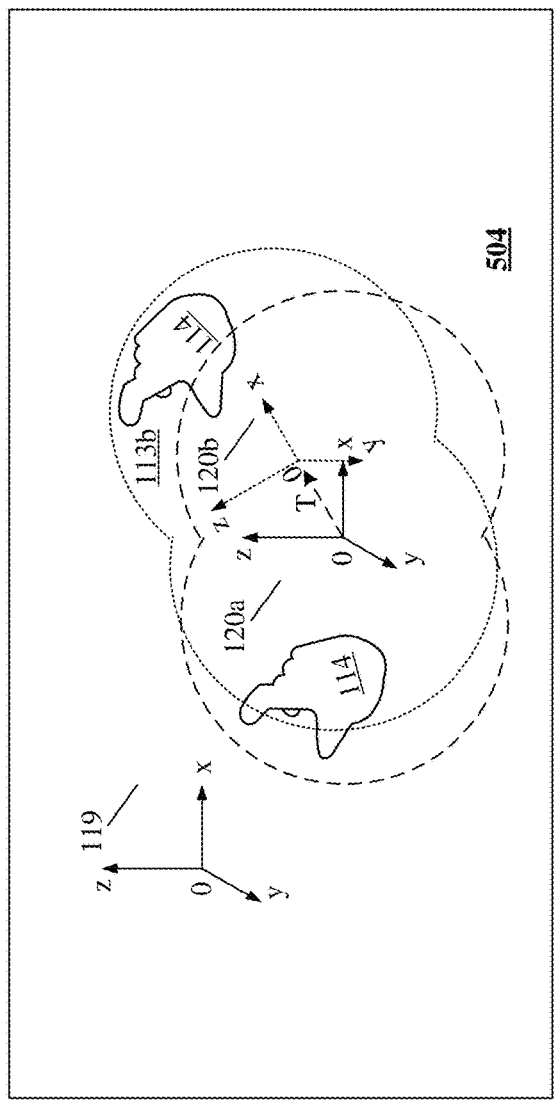

Now with reference to FIG. 5, an apparent movement of one or more moving objects from the perspective of the user of a virtual environment enabled apparatus 500 is illustrated. As shown by block 502, field of view 113a presented by device 101 at time $t_0$ includes an object 114. At time $t_0$, the position and orientation of tracked object 114 is known with respect to device reference frame 120a, again at time $t_0$. As shown by block 404, at time $t_1$, the position and orientation of both device reference frame 120b and tracked object 114 have changed. As shown by block 504, field of view 113b presented by device 101 at time $t_1$ includes object 114 in a new apparent position. Because the device 101 has moved, the device reference frame 120a or 120b has moved from an original or starting device reference frame 120a to a current or final reference frame 120b as indicated by transformation T. It is noteworthy that the device 101 can rotate as well as translate. Implementations can provide sensing the position and rotation of reference frame 120b with respect to reference frame 120a and sensing the position and rotation of tracked object 114 with respect to 120b, at time $t_1$. Implementations can determine the position and rotation of tracked object 114 with respect to 120a from the sensed position and rotation of reference frame 120b with respect to reference frame 120a and the sensed position and rotation of tracked object 114 with respect to 120b.

In an implementation, a transformation R is determined that moves dashed line reference frame 120a to dotted line reference frame 120b, without intermediate conversion to an absolute or world frame of reference. Applying the reverse transformation $R^T$ makes the dotted line reference frame 120b lie on top of dashed line reference frame 120a. Then the tracked object 114 will be in the right place from the point of view of dashed line reference frame 120a. (It is noteworthy that $R^T$ is equivalent to $R^{-1}$ for our purposes.) In determining the motion of object 114, sensory processing system 106 can determine its location and direction by computationally analyzing images captured by cameras 102, 104 and motion information captured by sensors 108, 110. For example, an apparent position of any point on the object (in 3D space) at time $$t = t_0: \begin{bmatrix} x \\ y \\ z \\ 1 \end{bmatrix},$$

can be converted to a real position of the point on the object at time $$t = t_1: \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}$$

from the frame of reference of the device. We refer to the combination of a rotation and translation, which are not generally commutative, as the affine transformation.

The correct location at time $t=t_1$ of a point on the tracked object with respect to device reference frame 120a is given by an inverse affine transformation, e.g., $$\begin{bmatrix} R_{ref}^T & -R_{ref}^T * T_{ref} \\ 0 & 1 \end{bmatrix}$$

as provided for in equation (1):

$$\begin{bmatrix} R_{ref}^T & (-R_{ref}^T) * T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:

$R_{ref}^T$—Represents the rotation matrix part of an affine transform describing the rotation transformation from the device reference frame 120a to the device reference frame 120b.

$T_{ref}$—Represents translation of the device reference frame 120a to the device reference frame 120b.

One conventional approach to obtaining the Affine transform R (from axis unit vector $u=(u_x, u_y, u_z)$, rotation angle $\theta$) method. Wikipedia, at http://en.wikipedia.org/wiki/Rotation_matrix, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix} \quad (2)$$

$$R^T = \begin{bmatrix} \cos\theta + u_x^2(1-\cos\theta) & u_y u_x(1-\cos\theta) + u_z\sin\theta & u_z u_x(1-\cos\theta) - u_y\sin\theta \\ u_x u_y(1-\cos\theta) - u_z\sin\theta & \cos\theta + u_y^2(1-\cos\theta) & u_z u_y(1-\cos\theta) + u_x\sin\theta \\ u_x u_z(1-\cos\theta) + u_y\sin\theta & u_y u_z(1-\cos\theta) - u_x\sin\theta & \cos\theta + u_z^2(1-\cos\theta) \end{bmatrix}$$

$$-R^T = \begin{bmatrix} -\cos\theta - u_x^2(1-\cos\theta) & -u_y u_x(1-\cos\theta) - u_z\sin\theta & -u_z u_x(1-\cos\theta) + u_y\sin\theta \\ -u_x u_y(1-\cos\theta) + u_z\sin\theta & -\cos\theta - u_y^2(1-\cos\theta) & -u_z u_y(1-\cos\theta) - u_x\sin\theta \\ -u_x u_z(1-\cos\theta) - u_y\sin\theta & -u_y u_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame, $$-R^T * T = \begin{bmatrix} (-\cos\theta - u_x^2(1-\cos\theta))(a) + (-\cos\theta - u_y^2(1-\cos\theta))(b) + \\ (-u_z u_x(1-\cos\theta) + u_y\sin\theta)(c) \\ (-u_x u_y(1-\cos\theta) + u_z\sin\theta)(a) + (-\cos\theta - u_y^2(1-\cos\theta))(b) + \\ (-u_z u_y(1-\cos\theta) - u_x\sin\theta)(c) \\ (-u_x u_z(1-\cos\theta) - u_y\sin\theta)(a) + (-u_y u_z(1-\cos\theta) + \\ u_x\sin\theta)(b) + (-\cos\theta - u_z^2(1-\cos\theta))(c) \end{bmatrix}$$

In another example, an apparent orientation and position of the object at time $t=t_0$: vector pair $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

The correct orientation and position of the tracked object with respect to device reference frame at time t=t$_0$ (120*a*) is given by an inverse affine transformation, e.g., $$\begin{bmatrix} R_{ref}^T & -R_{ref}^T * T_{ref} \\ 0 & 1 \end{bmatrix}$$

as provided for in equation (3):

$$\begin{bmatrix} R_{ref}^T & (-R_{ref}^T) * T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:
$R^T_{ref}$—Represents the rotation matrix part of an affine transform describing the rotation transformation from the device reference frame 120*a* to the device reference frame 120*b*.
$R_{obj}$—Represents a matrix describing the rotation at t$_0$ of the object with respect to the device reference frame 120*b*.
$R'_{obj}$—Represents a matrix describing the rotation at t$_1$ of the object with respect to the device reference frame 120*a*.
$T_{ref}$—Represents a vector translation of the device reference frame 120*a* to the device reference frame 120*b*.
$T_{obj}$—Represents a vector describing the position at t$_0$ of the object with respect to the device reference frame 120*b*.
$T'_{obj}$—Represents a vector describing the position at t$_1$ of the object with respect to the device reference frame 120*a*.

In a yet further example, an apparent orientation and position of the object at time t=t$_0$: affine transform $$\begin{bmatrix} R_{obj} & T_{obj} \\ 0 & 1 \end{bmatrix},$$

can be converted to a real orientation and position of the object at time $$t = t_1 : \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked object with respect to device reference frame at time t=t$_0$ (120*a*) is given by an inverse affine transformation, e.g., $$\begin{bmatrix} R_{init}^T & (-R_{init}^T) * T_{init} \\ 0 & 1 \end{bmatrix}$$

as provided for in equation (4):

$$\begin{bmatrix} R_{init}^T & (-R_{init}^T) * T_{init} \\ 0 & 1 \end{bmatrix} \begin{bmatrix} R_{ref}^T & (-R_{ref}^T) * T_{ref} \\ 0 & 1 \end{bmatrix} * \begin{bmatrix} R_{obj} & T_{obj} \\ 0 & 1 \end{bmatrix} = \quad (4)$$

$$\begin{bmatrix} R'_{obj} & T'_{obj} \\ 0 & 1 \end{bmatrix}$$

Where:
$R^T_{init}$—Represents a rotation matrix part of an affine transform describing the rotation transformation at t$_0$ from the world reference frame 119 to the device reference frame 120*a*.
$R^T_{ref}$—Represents the rotation matrix part of an affine transform describing the rotation transformation from the device reference frame 120*a* to the device reference frame 120*b*.
$R_{obj}$—Represents a matrix describing the rotation of the object at t$_0$ with respect to the device reference frame 120*b*.
$R'_{obj}$—Represents a matrix describing the rotation of the object at t$_1$ with respect to the device reference frame 120*a*.
$T_{init}$—Represents a vector translation at t$_0$ of the world reference frame 119 to the device reference frame 120*a*.
$T_{ref}$—Represents a vector translation at t$_1$ of the device reference frame 120*a* to the device reference frame 120*b*.
$T_{obj}$ Represents a vector describing the position at t$_0$ of the object with respect to the device reference frame 120*b*.
$T'_{obj}$—Represents a vector describing the position at t$_1$ of the object with respect to the device reference frame 120*a*.

In some implementations, the technology disclosed can build a world model with an absolute or world frame of reference. The world model can include representations of object portions (e.g. objects, edges of objects, prominent vortices) and potentially depth information when available from a depth sensor, depth camera or the like, within the viewpoint of the virtual or augmented reality head mounted sensor. The system can build the world model from image information captured by the cameras of the sensor. Points in 3D space can be determined from the stereo-image information are analyzed to obtain object portions. These points are not limited to a hand or other control object in a foreground; the points in 3D space can include stationary background points, especially edges. The model is populated with the object portions.

When the sensor moves (e.g., the wearer of a wearable headset turns her head) successive stereo-image information is analyzed for points in 3D space. Correspondences are made between two sets of points in 3D space chosen from the current view of the scene and the points in the world model to determine a relative motion of the object portions. The relative motion of the object portions reflects actual motion of the sensor.

Differences in points are used to determine an inverse transformation (the $$\begin{bmatrix} R^T & -R^T*T \\ 0 & 1 \end{bmatrix})$$

between model position and new position of object portions. In this affine transform, $R^T$ describes the rotational portions of motions between camera and object coordinate systems, and T describes the translational portions thereof.

The system then applies an inverse transformation of the object corresponding to the actual transformation of the device (since the sensor, not the background object moves) to determine the translation and rotation of the camera. Of course, this method is most effective when background objects are not moving relative to the world frame (i.e., in free space).

The model can be updated whenever we detect new points not previously seen in the model. The new points are added to the model so that it continually grows.

Of course, embodiments can be created in which (1) device cameras are considered stationary and the world model is considered to move; or (2) the device cameras are considered to be moving and the world model is considered stationary.

The use of a world model described above does not require any gyroscopic, accelerometer or magnetometer sensors, since the same cameras in a single unit (even the same cameras) can sense both the background objects and the control object. In any view where the system can recognize elements of the model, it can re-localize its position and orientation relative to the model and without drifting from sensor data. In some embodiments, motion sensors can be used to seed the frame to frame transformation and therefore bring correspondences between the rendered virtual or augmented reality scenery closer to the sensed control object, making the result less ambiguous (i.e., the system would have an easier time determining what motion of the head had occurred to result in the change in view from that of the model). In a yet further embodiment, sensor data could be used to filter the solution above so that the motions appear to be smoother from frame to frame, while still remaining impervious to drift caused by relying upon motion sensors alone.

Figure 6:
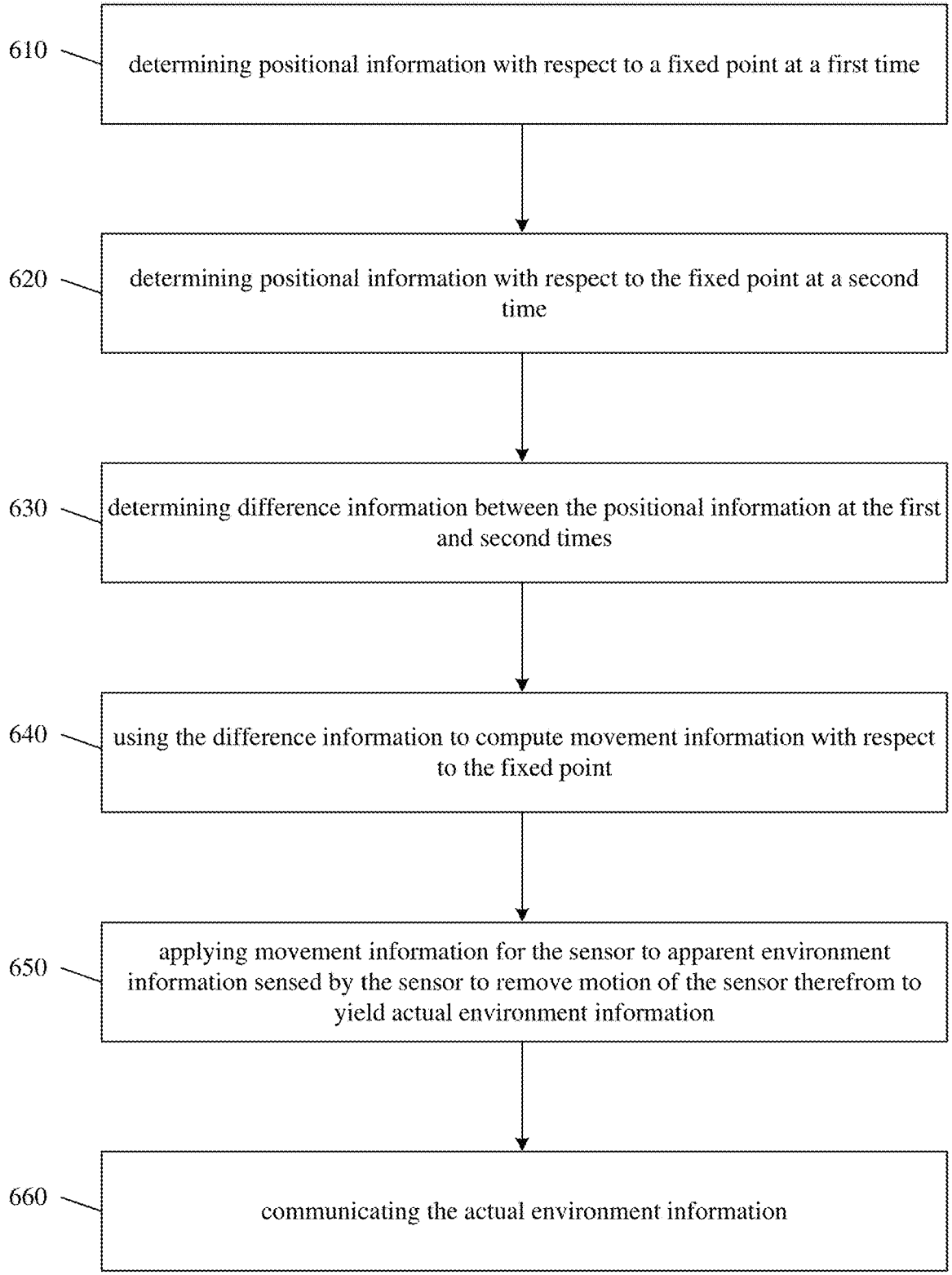
FIG. 6 shows a flowchart of one implementation of determining motion information in a movable sensor apparatus.

FIG. 6 shows a flowchart 600 of one implementation of determining motion information in a movable sensor apparatus. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 610, a first positional information of a portable or movable sensor is determined with respect to a fixed point at a first time. In one implementation, first positional information with respect to a fixed point at a first time $t=t_0$ is determined from one or motion sensors integrated with, or coupled to, a device including the portable or movable sensor. For example, an accelerometer can be affixed to device 101 of FIG. 1 or sensor 300 of FIG. 3, to provide acceleration information over time for the portable or movable device or sensor. Acceleration as a function of time can be integrated with respect to time (e.g., by sensory processing system 106) to provide velocity information over time, which can be integrated again to provide positional information with respect to time. In another example, gyroscopes, magnetometers or the like can provide information at various times from which positional information can be derived. These items are well known in the art and their function can be readily implemented by those possessing ordinary skill. In another implementation, a second motion-capture sensor (e.g., such as sensor 300A-C of FIG. 3 for example) is disposed to capture position information of the first sensor (e.g., affixed to 101 of FIG. 1 or sensor 300 of FIG. 3) to provide positional information for the first sensor.

At action 620, a second positional information of the sensor is determined with respect to the fixed point at a second time $t=t_1$.

At action 630, difference information between the first positional information and the second positional information is determined.

At action 640, movement information for the sensor with respect to the fixed point is computed based upon the difference information. Movement information for the sensor with respect to the fixed point is can be determined using techniques such as discussed above with reference to equations (2).

At action 650, movement information for the sensor is applied to apparent environment information sensed by the sensor to remove motion of the sensor therefrom to yield actual environment information. Motion of the sensor can be removed using techniques such as discussed above with reference to FIGS. 4-5.

At action 660, actual environment information is communicated.

Figure 7:
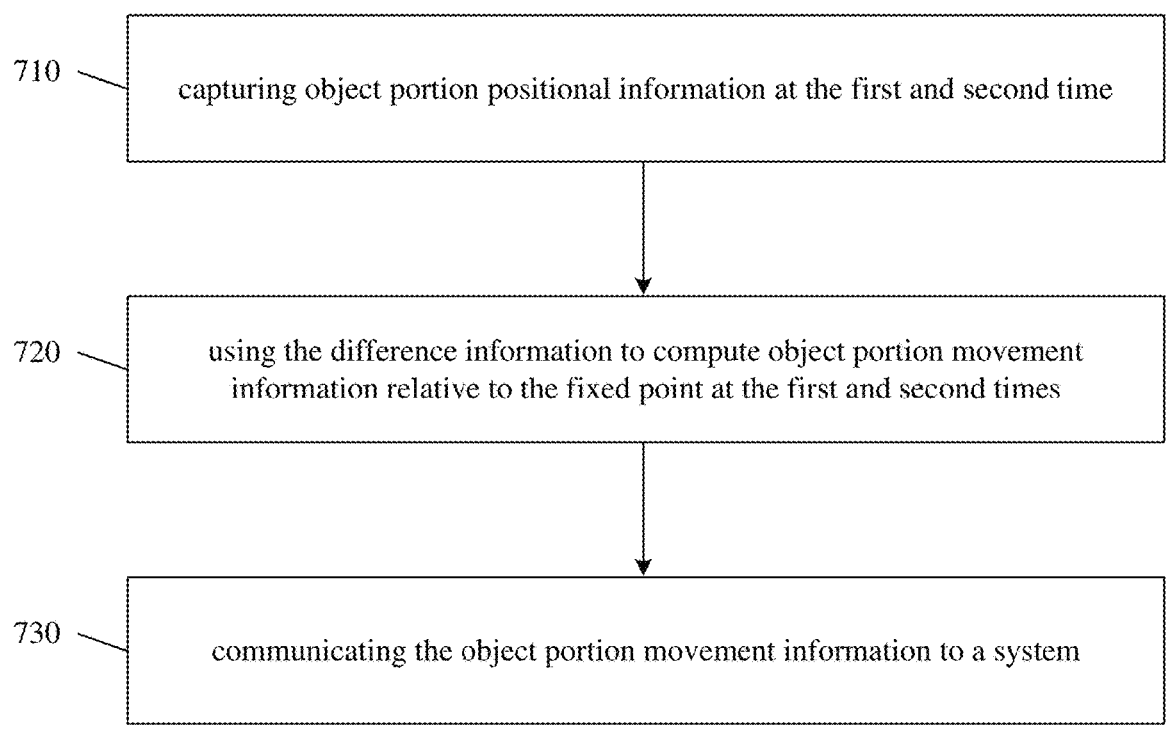
FIG. 7 shows a flowchart of one implementation of applying movement information to apparent environment information sensed by the sensor to yield actual environment information in a movable sensor apparatus.

FIG. 7 shows a flowchart 700 of one implementation of applying movement information for the sensor to apparent environment information (e.g., apparent motions of objects in the environment 112 as sensed by the sensor) to remove motion of the sensor therefrom to yield actual environment information (e.g., actual motions of objects in the environment 112 relative to the reference frame 120a). Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 710, positional information of an object portion at the first time and the second time are captured.

At action 720, object portion movement information relative to the fixed point at the first time and the second time is computed based upon the difference information and the movement information for the sensor.

At action 730, object portion movement information is communicated to a system.

Some implementations will be applied to virtual reality or augmented reality applications. For example, and with reference to FIG. 8, which illustrates a system 800 for projecting a virtual device experience 801 onto a surface medium 116 according to one implementation of the technology disclosed. System 800 includes a sensory processing system 106 controlling a variety of sensors and projectors, such as for example one or more cameras 102, 104 (or other image sensors) and optionally some illumination sources 115, 117 comprising an imaging system. Optionally, a plurality of vibrational (or acoustical) sensors 808, 810 positioned for sensing contacts with surface 116 can be included. Optionally projectors under control of system 106 can augment the virtual device experience 801, such as an optional audio projector 802 to provide for example audio feedback, optional video projector 804, an optional haptic projector 806 to provide for example haptic feedback to a user of virtual device experience 801. For further information on projectors, reference may be had to "Visio-Tactile Projector" YouTube <https://www.youtube.com/watch?v=Bb0hNMxxewg> (accessed Jan. 15, 2014). In operation, sensors and projectors are oriented toward a region of interest 112, that can include at least a portion of a surface 116, or free space 112 in which an object of interest 114 (in this example, a hand) moves along the indicated path 118.

Figure 9:
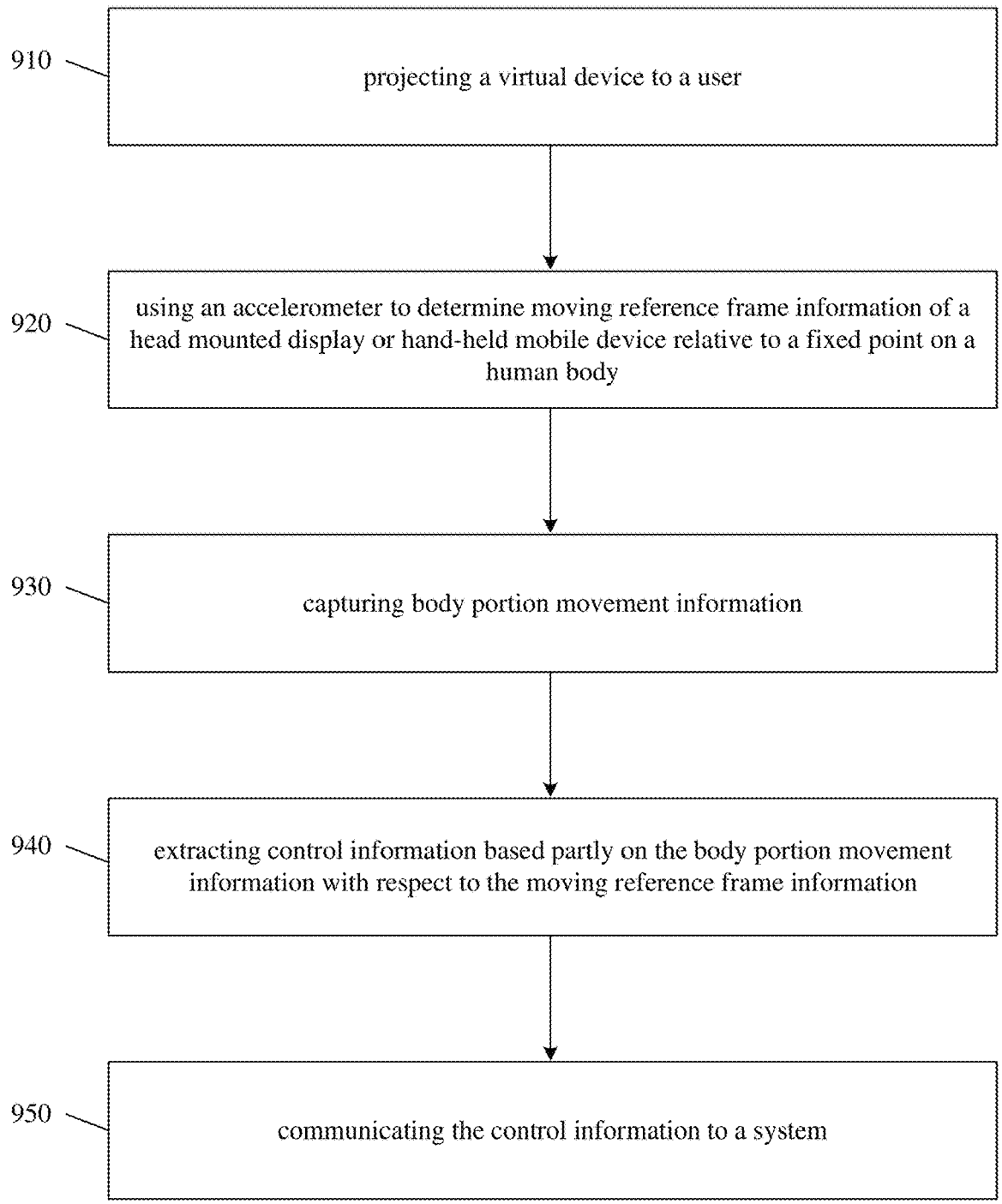
FIG. 9 shows a flowchart of one implementation of providing a virtual device experience.

FIG. 9 shows a flowchart 900 of one implementation of providing a virtual device experience. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, a virtual device is projected to a user. Projection can include an image or other visual representation of an object. For example, visual projection mechanism 804 of FIG. 8 can project a page (e.g., virtual device 801) from a book into a virtual environment 801 (e.g., surface portion 116 or in space 112) of a reader; thereby creating a virtual device experience of reading an actual book, or an electronic book on a physical e-reader, even though no book nor e-reader is present. In some implementations, optional haptic projector 806 can project the feeling of the texture of the "virtual paper" of the book to the reader's finger. In some implementations, optional audio projector 802 can project the sound of a page turning in response to detecting the reader making a swipe to turn the page.

At action 920, using an accelerometer, moving reference frame information of a head mounted display (or hand-held mobile device) relative to a fixed point on a human body is determined.

At action 930, body portion movement information is captured. Motion of the body portion can be detected via sensors 108, 110 using techniques such as discussed above with reference to FIG. 6.

At action 940, control information is extracted based partly on the body portion movement information with respect to the moving reference frame information. For example, repeatedly determining movement information for the sensor and the object portion at successive times and analyzing a sequence of movement information can be used to determine a path of the object portion with respect to the fixed point. For example, a 3D model of the object portion can be constructed from image sensor output and used to track movement of the object over a region of space. The path can be compared to a plurality of path templates and identifying a template that best matches the path. The template that best matches the path control information to a system can be used to provide the control information to the system. For example, paths recognized from an image sequence (or audio signal, or both) can indicate a trajectory of the object portion such as a gesture of a body portion.

At action 950, control information can be communicated to a system. For example, control information such as a command to turn the page of a virtual book can be sent based upon detecting a swipe along the desk surface of the reader's finger. Many other physical or electronic objects, impressions, feelings, sensations and so forth can be projected onto surface 116 (or in proximity thereto) to augment the virtual device experience and applications are limited only by the imagination of the user.

Figure 10:
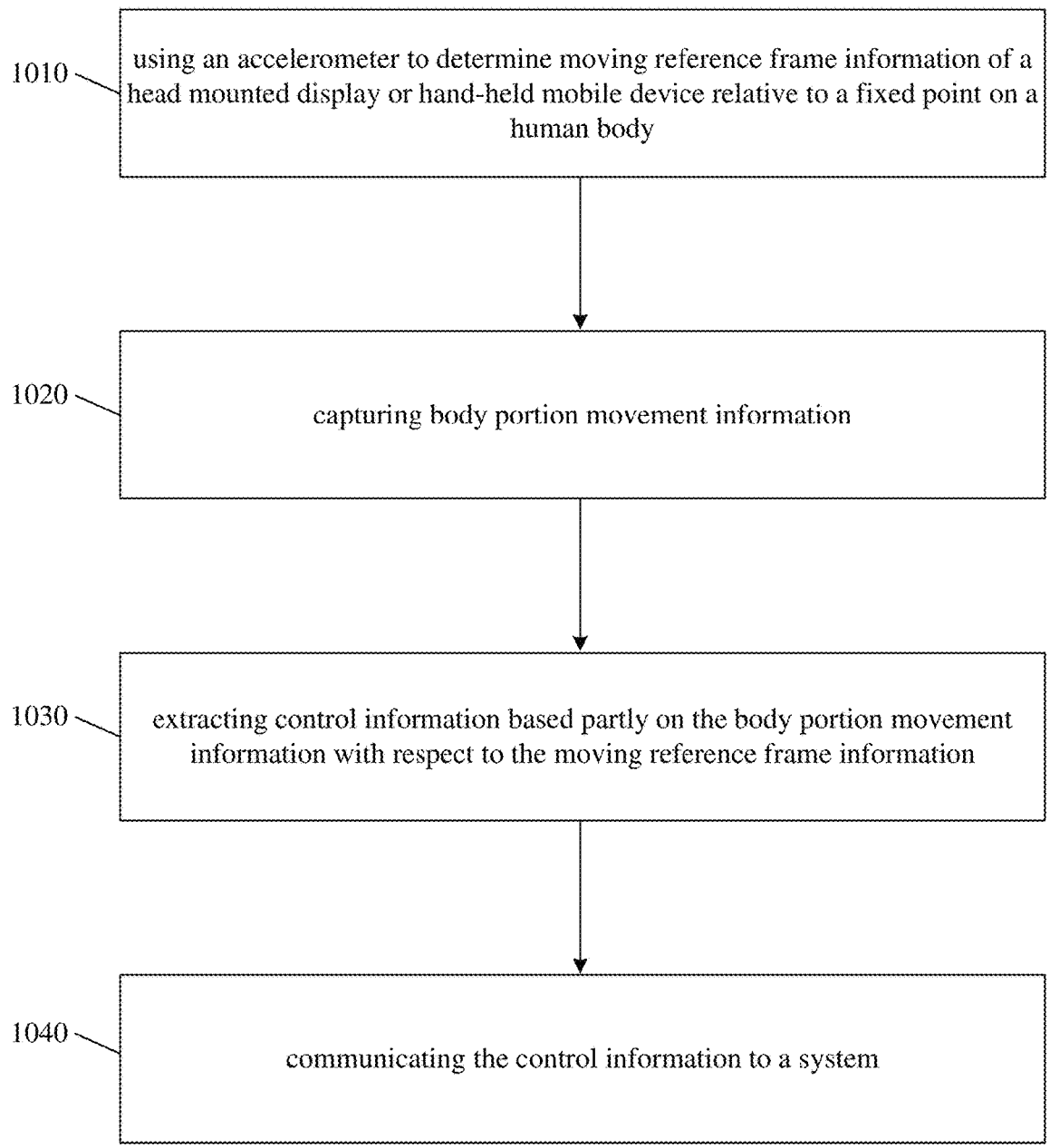
FIG. 10 shows a flowchart of one implementation of cancelling drift in a head mounted device (HMD).

FIG. 10 shows a flowchart 1000 of one implementation of cancelling drift in a head mounted device (HMD). Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1010, using an accelerometer, moving reference frame information of a head mounted display (or hand-held mobile device) relative to a fixed point on a human body is determined.

At action 1020, body portion movement information is captured.

At action 1030, control information is extracted based partly on the body portion movement information with respect to the moving reference frame information.

At action 1040, the control information is communicated to a system.

In some implementations, motion capture is achieved using an optical motion-capture system. In some implementations, object position tracking is supplemented by measuring a time difference of arrival (TDOA) of audio signals at the contact vibrational sensors and mapping surface locations that satisfy the TDOA, analyzing at least one image, captured by a camera of the optical motion-capture system, of the object in contact with the surface, and using the image analysis to select among the mapped TDOA surface locations as a surface location of the contact.

Reference may be had to the following sources, incorporated herein by reference, for further information regarding computational techniques:

1. Wikipedia <http://en.wikipedia.org/wiki/Euclidean_group> on Nov. 4, 2013, 04:08 UTC;

2. Wikipedia <http://en.wikipedia.org/wiki/Affine_transformation> on Nov. 25, 2013, 11:01 UTC;

3. Wikipedia <http://en.wikipedia.org/wiki/Rotation_matrix> Rotation matrix from axis and angle, on Jan. 30, 2014, 20:12 UTC;

4. Wikipedia <http://en.wikipedia.org/wiki/Rotation_group_SO(3)> Axis of rotation, on Jan. 21, 2014, 21:21 UTC;

5. Wikipedia <http://en.wikipedia.org/wiki/Transformation_matrix> Affine Transformations, on Jan. 28, 2014, 13:51 UTC; and 6. Wikipedia, at http://en.wikipedia.org/wiki/Axis%E2%80%93angle_representation> on Jan. 25, 2014, 03:26 UTC.

Figure 11:
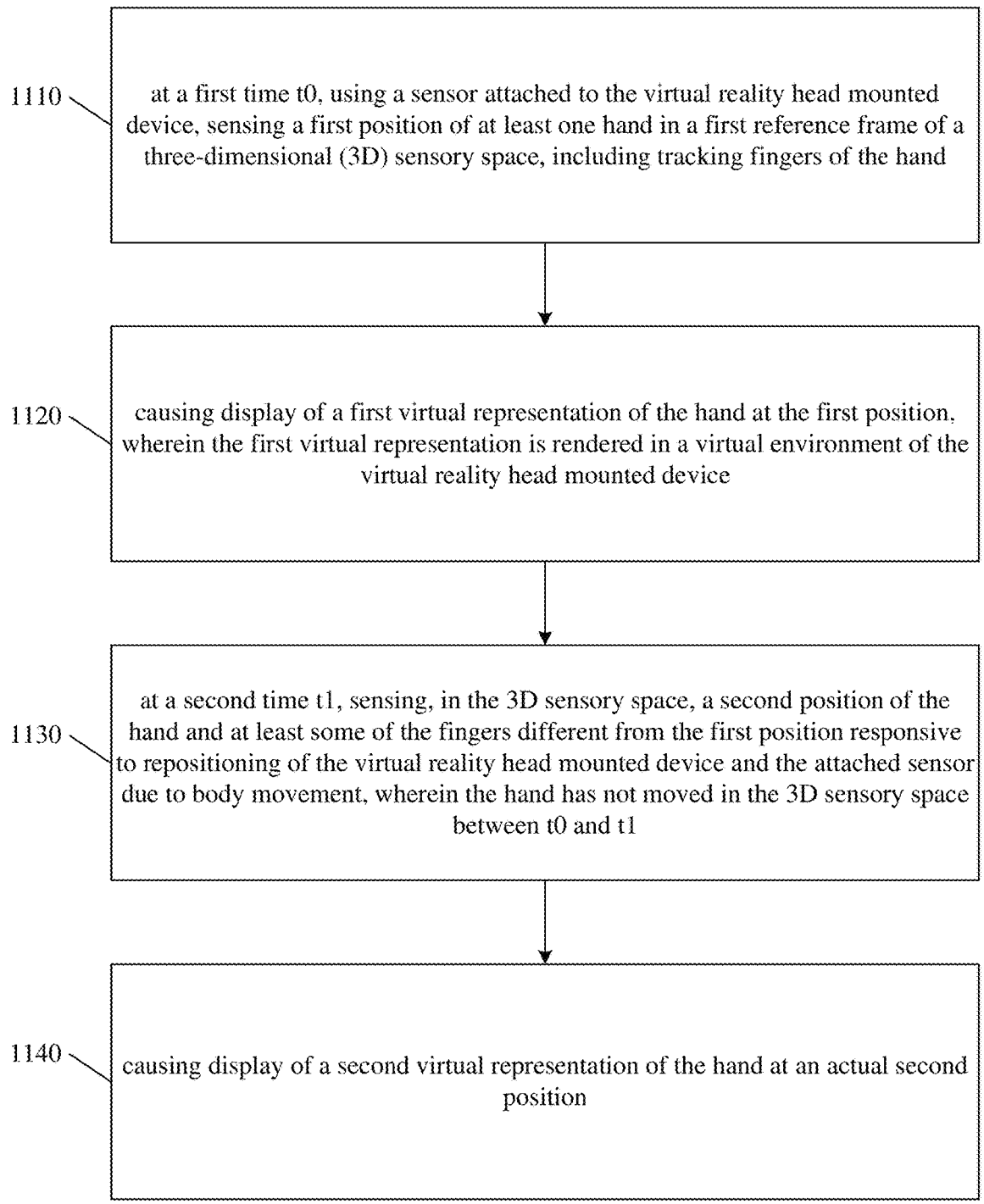
FIG. 11 is a representative method of integrating real three-dimensional (3D) space sensing with a virtual reality head mounted device.

FIG. 11 is a representative method 1100 of integrating real three-dimensional (3D) space sensing with a virtual reality head mounted device. Flowchart shown in FIG. 11 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 11. Multiple actions can be combined in some implementations. For convenience, this flowchart is described with reference to the system that carries out a method. The system is not necessarily part of the method.

At action 1110, a sensor attached to a virtual reality head mounted device is used to sense a first position of at least one hand in a first reference frame of a three-dimensional (3D) sensory space at a first time t0. In some implementations, the tracking of the hand includes tracking fingers of the hand.

At action 1120, display of a first virtual representation of the hand at the first position is caused. In one implementation, the first virtual representation is rendered in a virtual environment of the virtual reality head mounted device.

At action 1130, a second position of the hand and at least some of the fingers is sensed in the 3D sensory space at a second time t1 that is different from the first position. This occurs in response to repositioning of the virtual reality head mounted device and the attached sensor due to body movement. In one implementation, the hand does not move in the 3D sensory space between t0 and t1.

At action 1140, display of a second virtual representation of the hand at an actual second position is caused by sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the hand into the common reference frame. In one implementation, the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In one implementation, transforming the first and second positions of the hand into the common reference frame further includes applying an affine transformation. It also includes determining the orientation of the hand at the first position with respect to the first reference frame and causing the display of the hand accordingly. In yet another implementation, the method includes, determining the orientation of the hand at the second position with respect to the second reference frame and causing the display of the hand accordingly.

In one implementation, the determining the position of the hand at the first position further includes calculating a translation of the hand with respect to the common reference frame and causing the display of the hand accordingly. In another implementation, the determining the position of the hand at the second position further includes calculating a translation of the hand with respect to the common reference frame and causing the display of the hand accordingly.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 12:
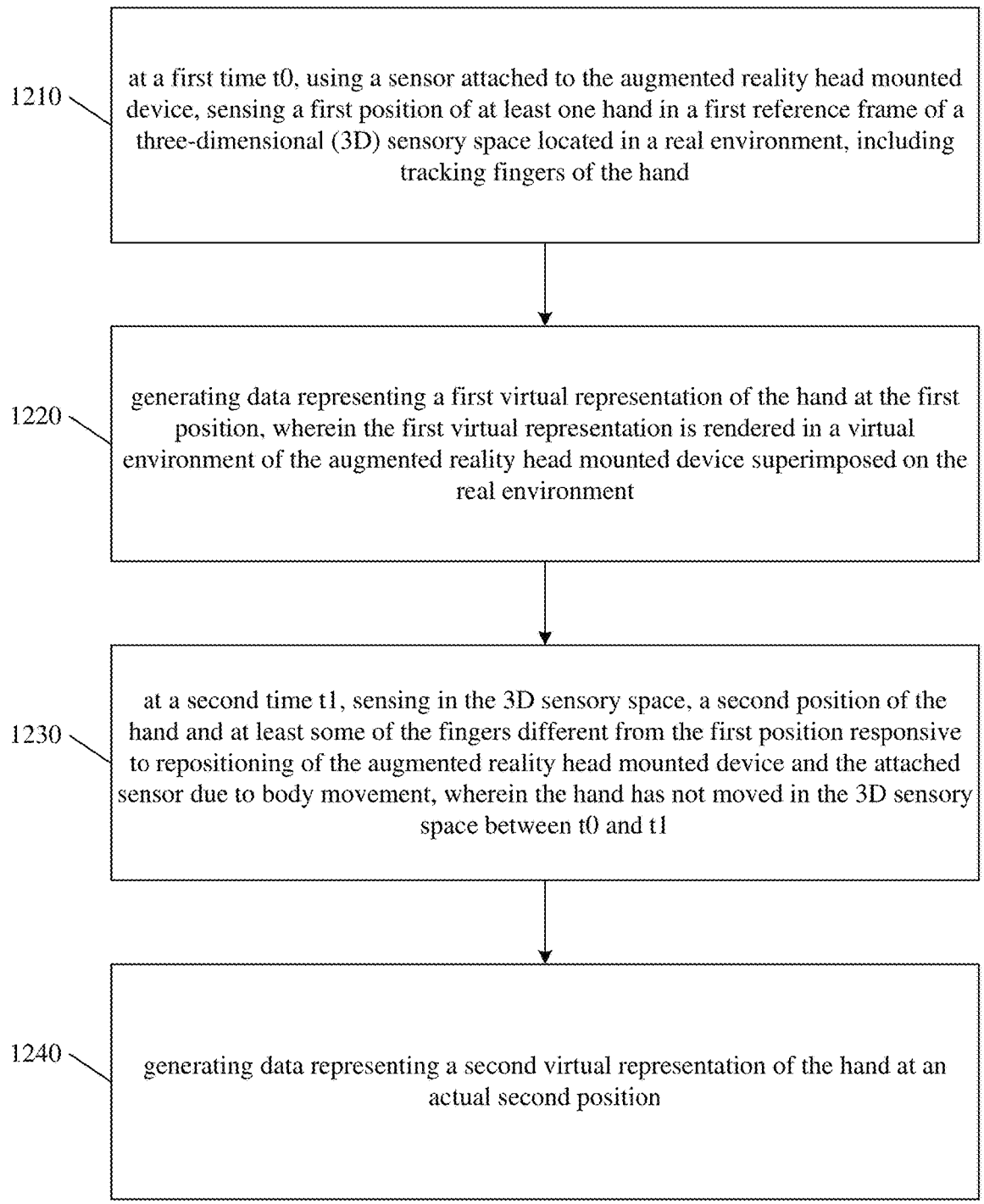
FIG. 12 depicts a flowchart of integrating real three-dimensional (3D) space sensing with an augmented reality head mounted device.

FIG. 12 depicts a flowchart 1200 of integrating real three-dimensional (3D) space sensing with an augmented reality head mounted device. Flowchart shown in FIG. 12 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 12. Multiple actions can be combined in some implementations. For convenience, this flowchart is described with reference to the system that carries out a method. The system is not necessarily part of the method.

At action 1210, a sensor attached to the augmented reality head mounted device is used to sense a first position of at least one hand, at a first time t0, in a first reference frame of a three-dimensional (3D) sensory space located in a real environment. In one implementation, tracking the hand includes tracking fingers of the hand.

At action 1220, data representing a first virtual representation of the hand at the first position is generated. In one implementation, the first virtual representation is rendered in a virtual environment of the augmented reality head mounted device superimposed on the real environment.

At action 1230, a second position of the hand and at least some of the fingers is sensed in the 3D sensory space at a second time t1. In one implementation, the second position is different from the first position. This occurs in response to repositioning of the augmented reality head mounted device and the attached sensor due to body movement. In one implementation, the hand does not move in the 3D sensory space between t0 and t1.

At action 1240, data representing a second virtual representation of the hand at an actual second position is generated by sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the hand into the common reference frame. In one implementation, the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, the transforming the first and second positions of the hand into the common reference frame further includes applying an affine transformation. In other implementations, the method further includes determining the orientation of the hand at the first position with respect to the first reference frame and causing interaction between the hand and the augmented reality accordingly. In yet other implementations, the method includes determining the orientation of the hand at the second position with respect to the second reference frame and causing interaction between the hand and the augmented reality accordingly.

In one implementation, the determining the position of the hand at the first position further includes calculating a translation of the hand with respect to the common reference frame and causing interaction between the hand and the augmented reality accordingly. In another implementation, the determining the position of the hand at the second position further includes calculating a translation of the hand with respect to the common reference frame and causing interaction between the hand and the augmented reality accordingly.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 13:
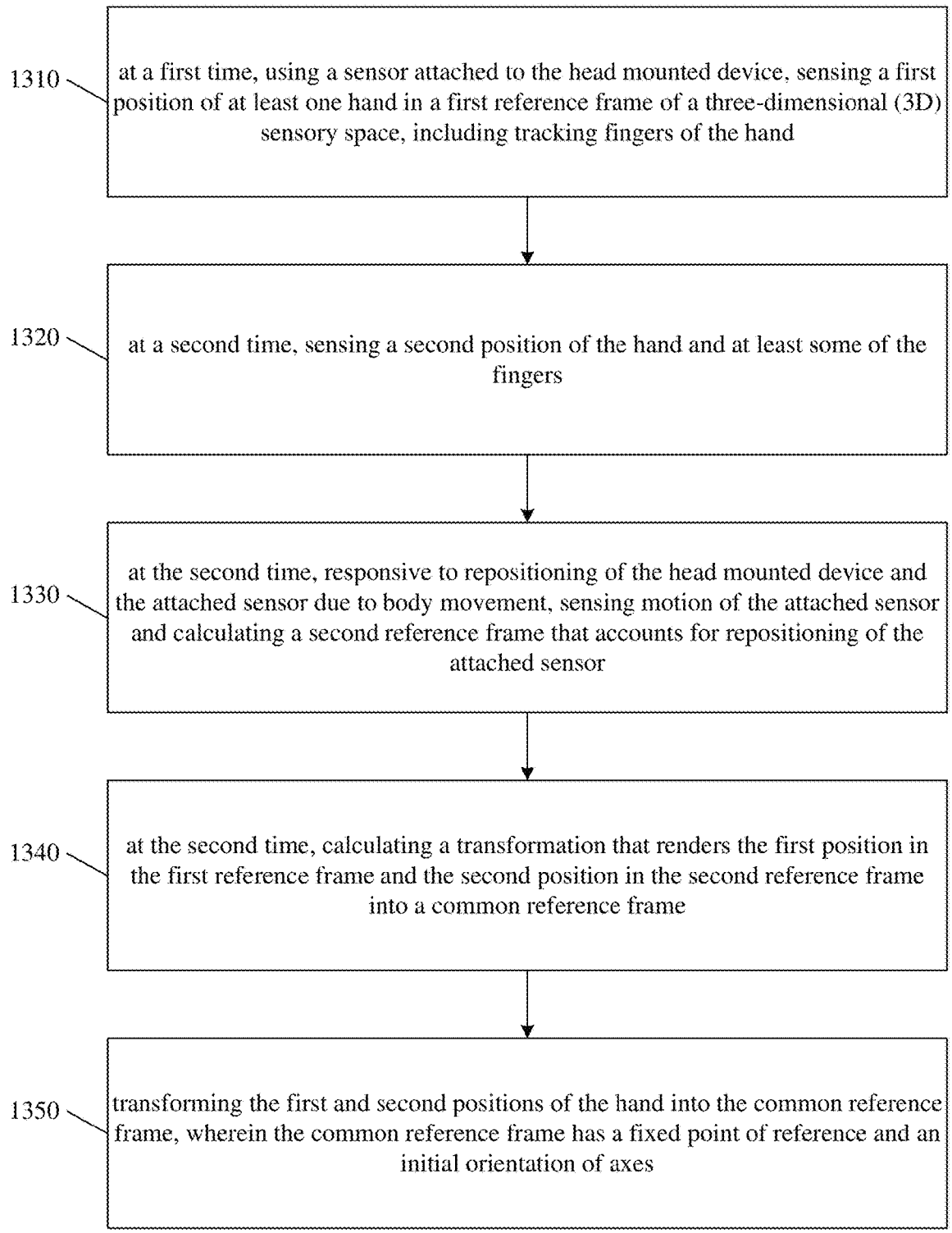
FIG. 13 illustrates a flowchart of a representative method of integrating real three-dimensional (3D) space sensing with a head mounted device that renders a virtual background and one or more virtual objects is described.

FIG. 13 illustrates a flowchart 1300 of a representative method of integrating real three-dimensional (3D) space sensing with a head mounted device that renders a virtual background and one or more virtual objects is described. Flowchart shown in FIG. 13 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 13. Multiple actions can be combined in some implementations. For convenience, this flowchart is described with reference to the system that carries out a method. The system is not necessarily part of the method.

At action 1310, a sensor attached to the head mounted device is used to sense a first position of at least one hand, at a first time, in a first reference frame of a three-dimensional (3D) sensory space. In one implementation, tracking the hand includes tracking fingers of the hand.

At action 1320, a second position of the hand and at least some of the fingers is sensed at a second time.

At action 1330, responsive to repositioning of the head mounted device and the attached sensor due to body movement, motion of the attached sensor is sensed and a second reference frame that accounts for repositioning of the attached sensor is calculated.

At action 1340, a transformation is calculated, which renders the first position in the first reference frame and the second position in the second reference frame into a common reference frame.

At action 1350, the first and second positions of the hand are transformed into the common reference frame. In one implementation, the common reference frame has a fixed point of reference and an initial orientation of axes.

In one implementation, the common reference frame is a world reference frame that does not change as the attached sensor is repositioned. In another implementation, the common reference frame is the second reference frame.

In some implementations, the attached sensor is integrated into a unit with the virtual reality head mounted device. In other implementations, the transforming the first and second positions of the hand into the common reference frame further includes applying at least one affine transformation.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 14:
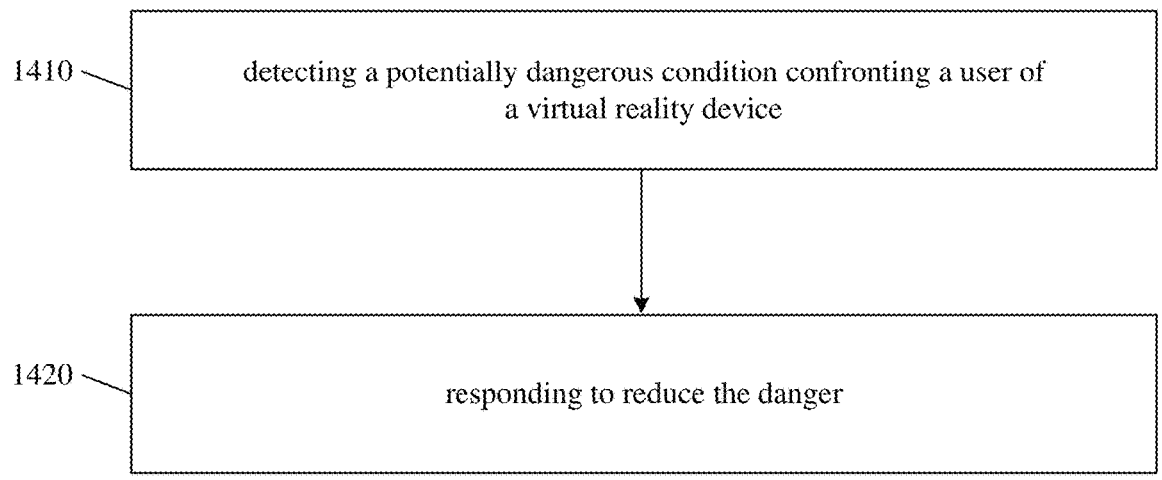
FIG. 14 shows a flowchart of one implementation of responding to a potentially unsafe condition detected by a head mounted device (HMD).

FIG. 14 shows a flowchart 1400 of one implementation of responding to a potentially unsafe condition detected by a head mounted device (HMD). Flowchart 1400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 14. Multiple actions can be combined in some implementations. For convenience, this flowchart is described with reference to the system that carries out a method. The system is not necessarily part of the method.

Figure 15:
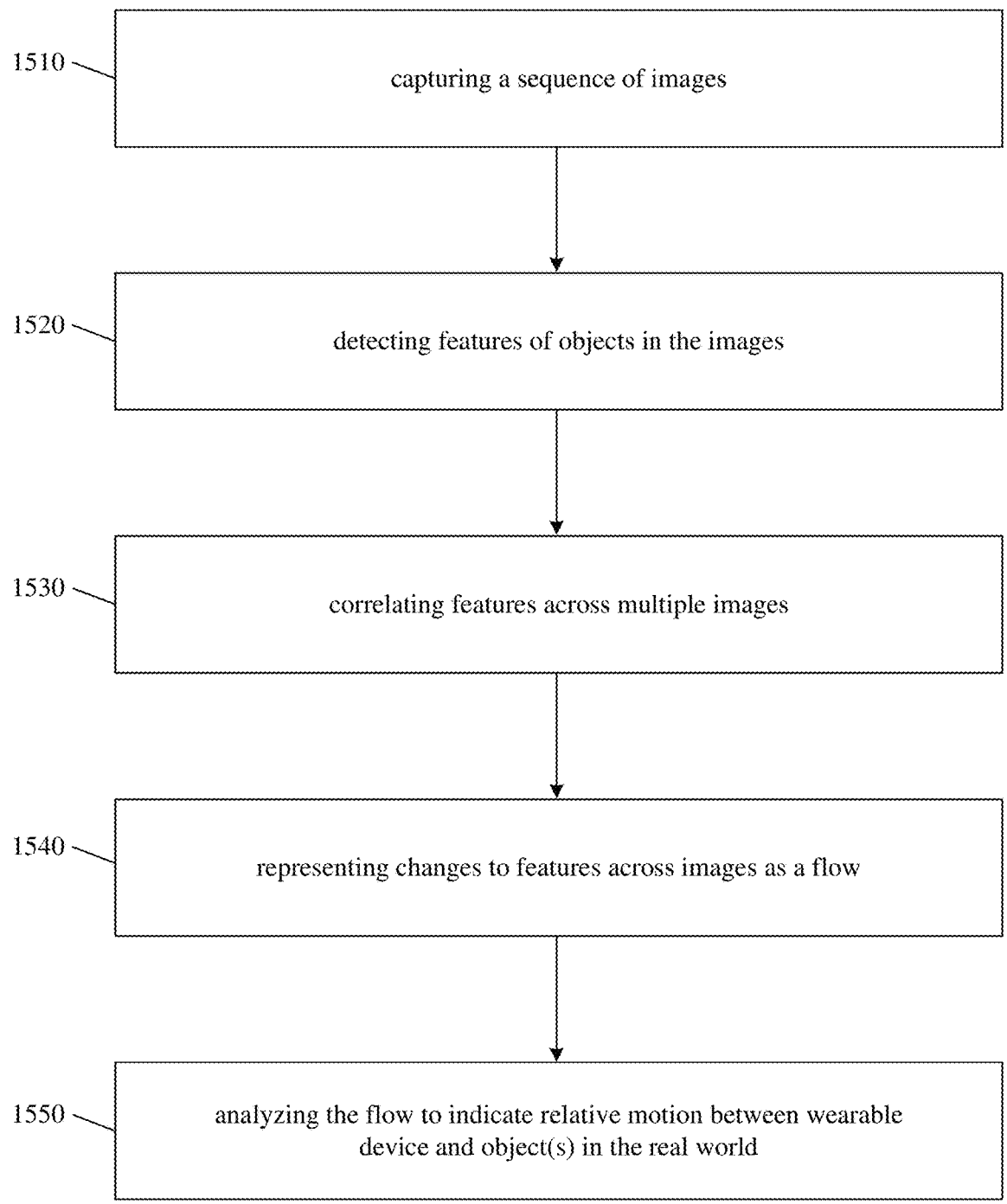
FIG. 15 shows a flowchart of one implementation of detecting a potentially dangerous situation.

At action 1410, a potentially dangerous situation (e.g., collision with real world objects, loss of situational awareness, etc.) to the user of a virtual reality device is detected using e.g., optical image sensing. In one implementation, and with reference to FIG. 15, illustrating a flowchart 1500 of an implementation of detecting potentially dangerous situation, a sequence of images can be captured (action 1510). The images can be correlated to construct a 3-D model(s) of real world object(s), including position and shape. A succession of images can be analyzed to model motion(s) and/or position(s) of object(s) surrounding the user. Features can be detected (action 1520) and correlated (action 1530) across multiple images. Changes to the features can be represented (action 1540) by a flow. Analysis of the flow (action 1550) indicates relative motion between the cameras of the wearable device and the object(s) in the real world space. Flows can be represented by one or more of vector fields, probabilistic representations, other representations characterizing a flow, or combinations thereof.

When potentially dangerous situations (e.g., collisions with real world objects) are detected (action 1520), the system can respond to alert the user and/or reduce the danger. For example, the system can enter a "pass-through" mode in which live video is substituted for virtual reality, enabling the user to perceive the imminent danger directly.

In another example, a warning can be raised to the user of the potentially dangerous condition. In a yet further example, the potentially dangerous condition is virtualized and added to the virtual reality being displayed to the user.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 16:
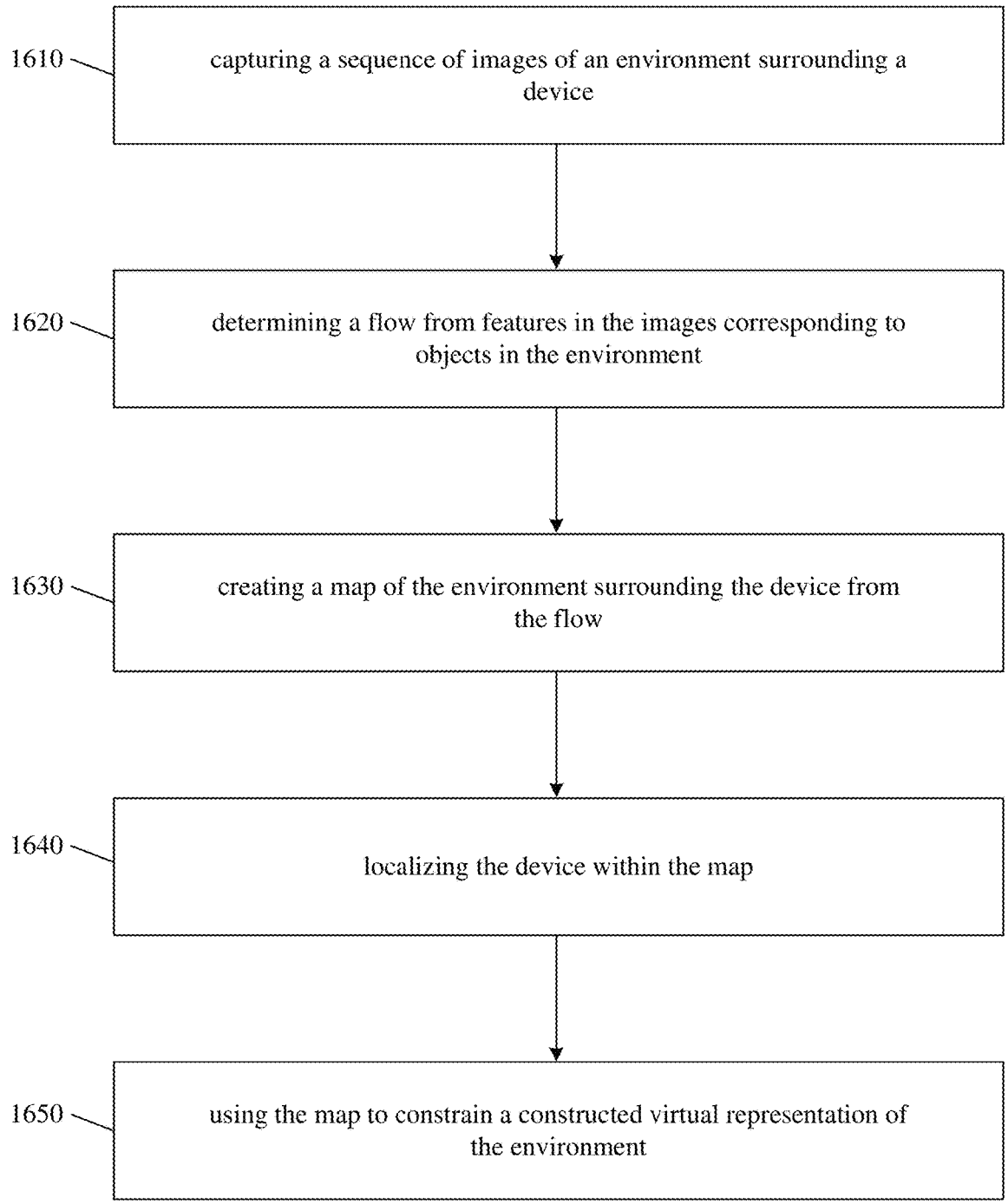
FIG. 16 shows a flowchart of one implementation of creating a map of an environment surrounding a user of a virtual reality device.

FIG. 16 shows a flowchart 1600 of one implementation of creating a map of an environment surrounding a user of a virtual reality device. The map can be advantageously employed to track hazards, objects, opportunities, or other points potentially of interest. Flowchart 1600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 16. Multiple actions can be combined in some implementations. For convenience, this flowchart is described with reference to the system that carries out a method. The system is not necessarily part of the method.

At action 1610, a sequence of images is captured. Capturing can include recording, or receiving recorded images of an environment surrounding a device, a user of a device, or a sensor component of a device.

At action 1620, a flow can be determined from features identified in the images. For example, features in the images corresponding to objects in the environment are detected. The features of the objects are correlated across multiple images to determine change. The change can be represented as a flow.

At action 1630, based at least in part upon that flow, a map of the environment can be created. In one implementation, a map is created by constructing a graph from connected relative locations of features detected in the sequence of images. Motion of the device (or sensor) and user when co-located can be detected and used to help determine differences in perceived locations of features in the sequence of images.

At action 1640, the device (and its user when the user and device are co-located) is localized in the environment using the map.

At action 1650, the device uses the map as constraint(s) upon which to construct a virtualized representation. For example, a device equipped with a VR system can prevent the user of the device from approaching anywhere near hazards (e.g., walls, tables) indicated by the map. Dynamic hazards (e.g., swinging doors, shots fired, etc.) can be monitored for separately. Advantageously, processing time can be reduced when a user enters a previously visited portion of the environment, since the device need scan for new or changed conditions (e.g., that might present hazards, opportunities or points of interest).

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 17:
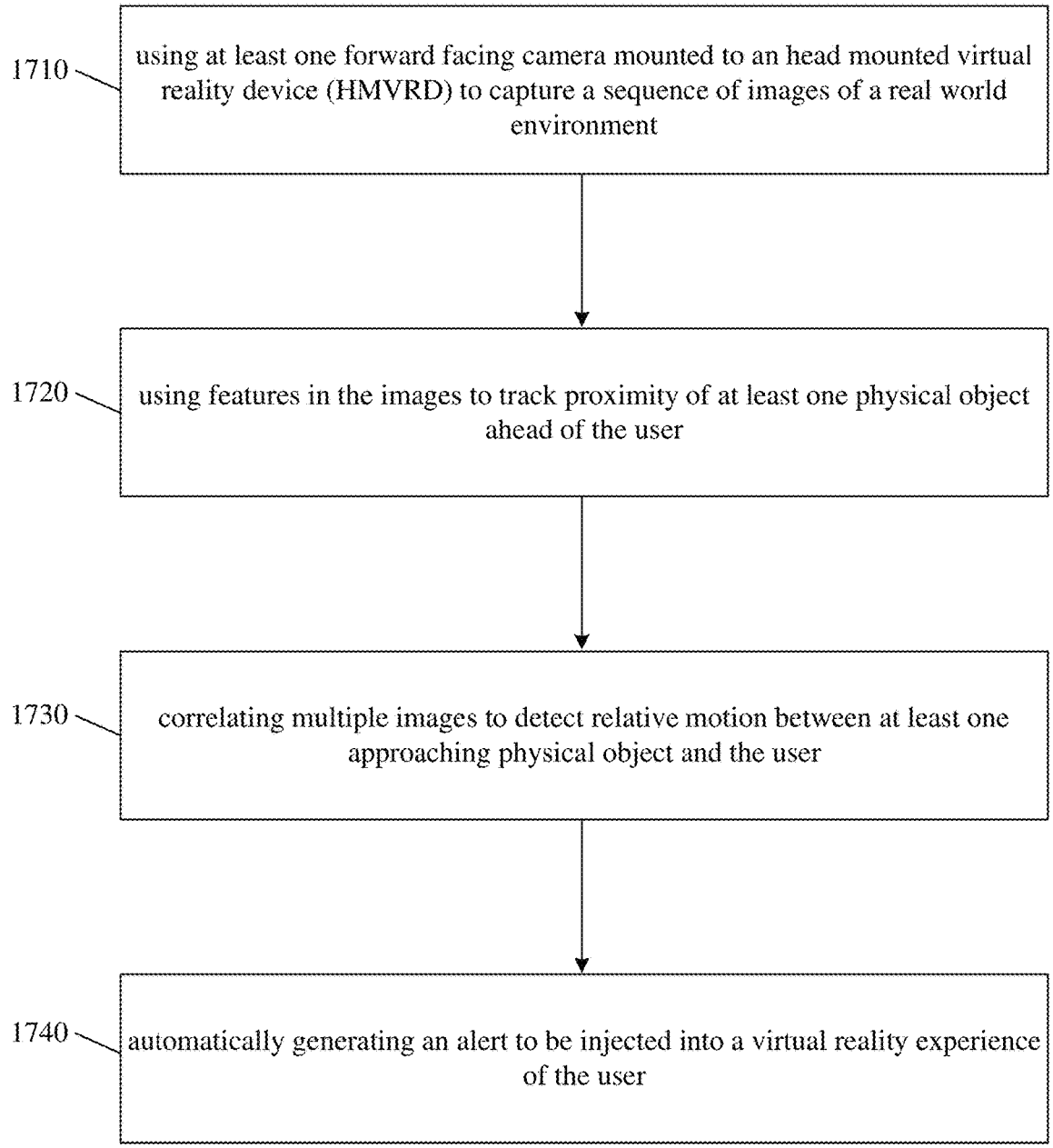
FIG. 17 depicts a representative method of detecting an imminent collision with a physical object during a virtual reality experience.

FIG. 17 depicts a representative method 1700 of detecting an imminent collision with a physical object during a virtual reality experience. Flowchart 1700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 17. Multiple actions can be combined in some implementations. For convenience, this flowchart is described with reference to the system that carries out a method. The system is not necessarily part of the method.

At action 1710, at least one forward facing camera mounted to a head mounted virtual reality device (HMVRD) is used to capture a sequence of images of a real world environment ahead of a user wearing the HMVRD.

At action 1720, features in the images are used to track proximity of at least one physical object ahead of the user. The method includes using features in the images to distinguish among different approaching physical objects in the real world environment. The method also includes using features in the images to distinguish among different perspectives of a particular approaching physical object from varying vantage points of the forward facing camera. In some implementations, using features in the images to track proximity of at least one physical object ahead of the user further includes detecting at least one difference between the features between times t0 and t1 using at least one of a vector field flow and probabilistic flow.

At action 1730, multiple images are correlated to detect relative motion between at least one approaching physical object and the user. The method further includes integrating the real world environment with an HMVRD. It includes, at a first time t0, using a sensor attached to the HMVRD, sensing a first position of at least one physical object in a first reference frame of the real world environment, including tracking portions of the physical object. It also includes causing display of a first virtual representation of the physical object at the first position, wherein the first virtual representation is rendered in a virtual environment of the HMVRD. The method further includes, at a second time t1, sensing, in the real world environment, a second position of the physical object and at least some of the portions different from the first position responsive to repositioning of the real world environment and the attached sensor due to body movement of the user, wherein the physical object has not moved in the real world environment between t0 and t1.

Further, it includes causing display of a second virtual representation of the physical object at an actual second position.

Causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame. In one implementation, the common reference frame has a fixed point of reference and an initial orientation of axes, whereby the sensed second position is transformed to the actual second position.

In some implementations, the common reference frame is a world reference frame that does not change as the attached sensor is repositioned. In other implementations, the common reference frame is the second reference frame.

In some implementations, the transforming the first and second positions of the physical object into the common reference frame further includes applying an affine transformation.

The method includes determining the orientation of the physical object at the first position with respect to the first reference frame and causing the display of the physical object accordingly.

The method also includes determining the orientation of the physical object at the second position with respect to the second reference frame and causing the display of the physical object accordingly.

At action 1740, responsive to detecting the approaching physical object within a proximity threshold, an alert is automatically generated to be injected into a virtual reality experience of the user. In one implementation, automatically generating the alert further includes generating data that represents the approaching physical object in a virtual environment of the HMVRD. In another implementation, automatically generating the alert further includes entering a pass through mode that interrupts the virtual reality experience and substitutes a live feed of the real world environment in a virtual environment of the HMVRD. In yet another implementation, automatically generating the alert further includes generating a physical warning feedback. In some implementations, the physical warning feedback is a haptic feedback. In other implementations, the physical warning feedback is an audio message generated by the HMVRD. In yet other implementations, the physical warning feedback is a visual feedback generated in a virtual environment of the HMVRD.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 18:
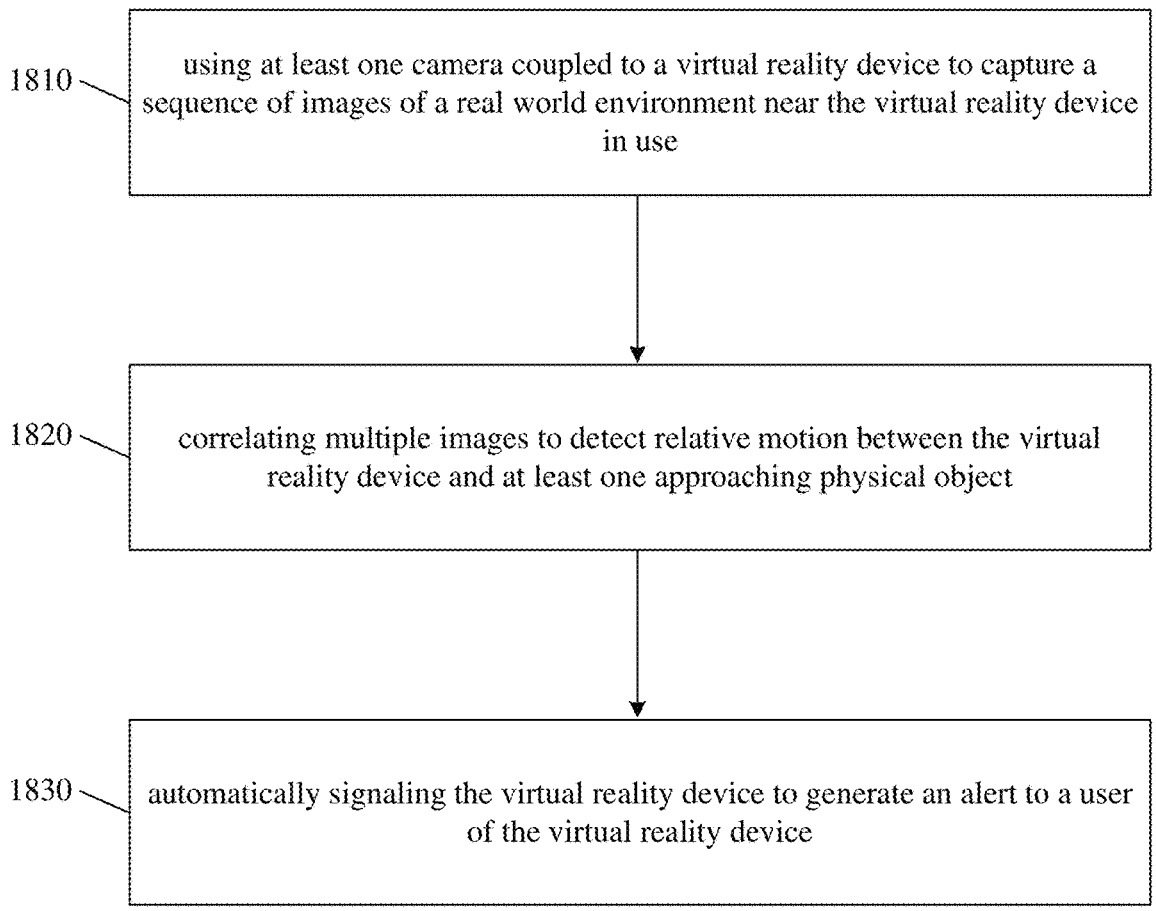
FIG. 18 illustrates one implementation of a method of detecting an imminent collision with a physical object during a virtual reality experience.

FIG. 18 illustrates one implementation of a method 1800 of detecting an imminent collision with a physical object during a virtual reality experience. Flowchart 1800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 18. Multiple actions can be combined in some implementations. For convenience, this flowchart is described with reference to the system that carries out a method. The system is not necessarily part of the method.

At action 1810, at least one camera coupled to a virtual reality device is used to capture a sequence of images of a real world environment near the virtual reality device in use.

At action 1820, multiple images are correlated to detect relative motion between the virtual reality device and at least one approaching physical object. The method further includes integrating the real world environment with an HMVRD. It includes, at a first time t0, using a sensor attached to the HMVRD, sensing a first position of at least one physical object in a first reference frame of the real world environment, including tracking portions of the physical object. It also includes causing display of a first virtual representation of the physical object at the first position, wherein the first virtual representation is rendered in a virtual environment of the HMVRD. The method further includes, at a second time t1, sensing, in the real world environment, a second position of the physical object and at least some of the portions different from the first position responsive to repositioning of the real world environment and the attached sensor due to body movement of the user, wherein the physical object has not moved in the real world environment between t0 and t1. Further, it includes causing display of a second virtual representation of the physical object at an actual second position.

Causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame. In one implementation, the common reference frame has a fixed point of reference and an initial orientation of axes, whereby the sensed second position is transformed to the actual second position.

In some implementations, the common reference frame is a world reference frame that does not change as the attached sensor is repositioned. In other implementations, the common reference frame is the second reference frame.

In some implementations, the transforming the first and second positions of the physical object into the common reference frame further includes applying an affine transformation.

The method includes determining the orientation of the physical object at the first position with respect to the first reference frame and causing the display of the physical object accordingly.

The method also includes determining the orientation of the physical object at the second position with respect to the second reference frame and causing the display of the physical object accordingly.

In some implementations, features in the images are used to track proximity of at least one physical object ahead of the user. The method includes using features in the images to distinguish among different approaching physical objects in the real world environment. The method also includes using features in the images to distinguish among different perspectives of a particular approaching physical object from varying vantage points of the forward facing camera. In some implementations, using features in the images to track proximity of at least one physical object ahead of the user further includes detecting at least one difference between the features between times t0 and t1 using at least one of a vector field flow and probabilistic flow.

At action 1830, responsive to detecting the approaching physical object within a proximity threshold, the virtual reality device is automatically signaled to generate an alert to a user of the virtual reality device. In one implementation, automatically generating the alert further includes generating data that represents the approaching physical object in a virtual environment of the HMVRD. In another implementation, automatically generating the alert further includes entering a pass through mode that interrupts the virtual reality experience and substitutes a live feed of the real world environment in a virtual environment of the HMVRD. In yet another implementation, automatically generating the alert further includes generating a physical warning feedback. In some implementations, the physical warning feedback is a haptic feedback. In other implementations, the physical warning feedback is an audio message generated by the HMVRD. In yet other implementations, the physical warning feedback is a visual feedback generated in a virtual environment of the HMVRD.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 19:
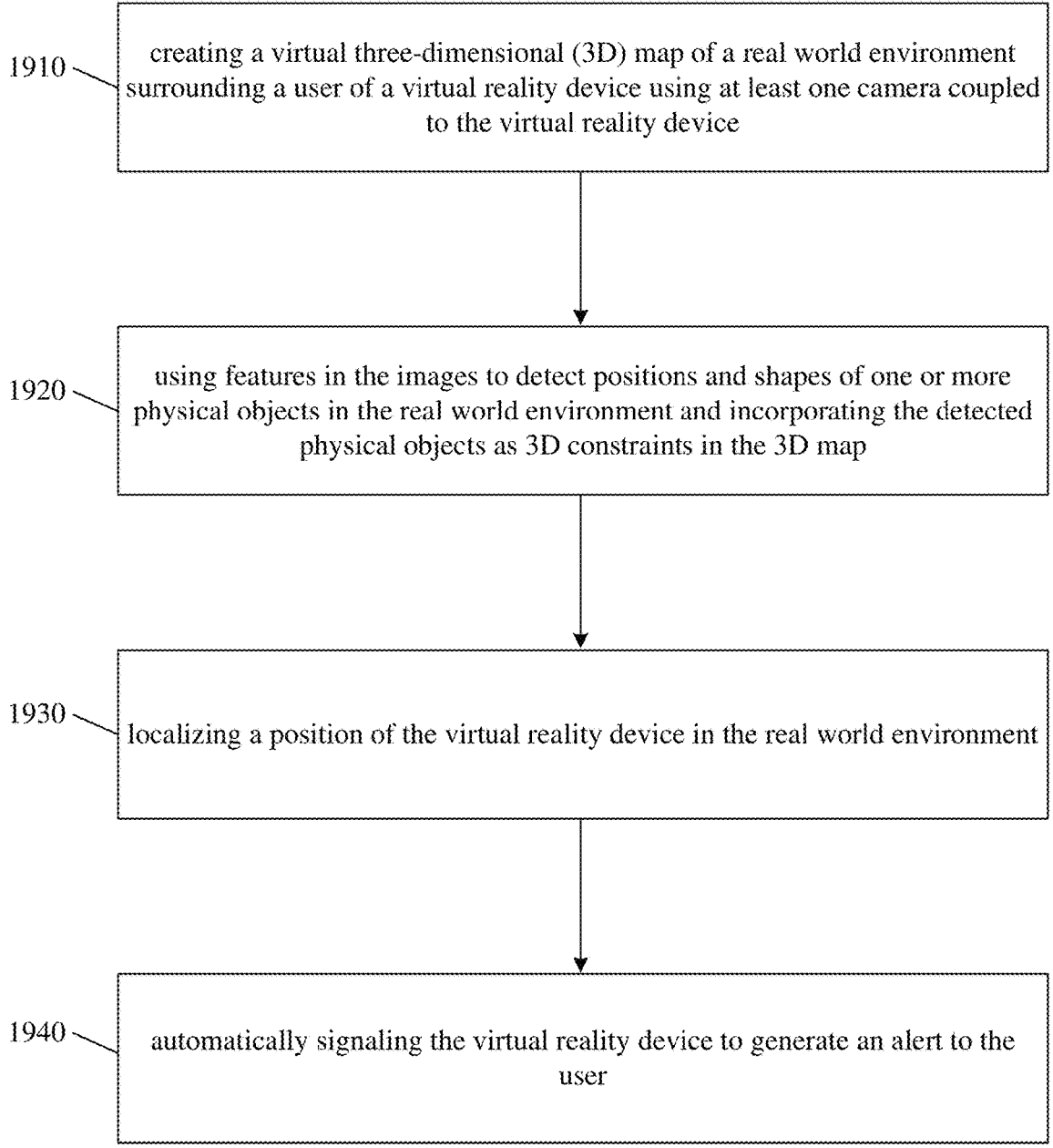
FIG. 19 is a flowchart showing a method of efficiently detecting an imminent collision with a physical object during a virtual reality experience.

FIG. 19 is a flowchart 1900 showing a method of efficiently detecting an imminent collision with a physical object during a virtual reality experience. Flowchart 1900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 19. Multiple actions can be combined in some implementations. For convenience, this flowchart is described with reference to the system that carries out a method. The system is not necessarily part of the method.

At action 1910, a virtual three-dimensional (3D) map of a real world environment surrounding a user of a virtual reality device is created using at least one camera coupled to the virtual reality device that captures a sequence of images of the real world environment.

At action 1920, features in the images are used to detect positions and shapes of one or more physical objects in the real world environment and incorporating the detected physical objects as 3D constraints in the 3D map, wherein the 3D constraints represent actual positions and shapes of the physical objects in the real world environment. The method includes using features in the images to distinguish among different approaching physical objects in the real world environment. The method also includes using features in the images to distinguish among different perspectives of a particular approaching physical object from varying vantage points of the forward facing camera. In some implementations, using features in the images to track proximity of at least one physical object ahead of the user further includes detecting at least one difference between the features between times t0 and t1 using at least one of a vector field flow and probabilistic flow.

At action 1930, a position of the virtual reality device is localized in the real world environment. The method further includes integrating the real world environment with an HMVRD. It includes, at a first time t0, using a sensor attached to the HMVRD, sensing a first position of at least one physical object in a first reference frame of the real world environment, including tracking portions of the physical object. It also includes causing display of a first virtual representation of the physical object at the first position, wherein the first virtual representation is rendered in a virtual environment of the HMVRD. The method further includes, at a second time t1, sensing, in the real world environment, a second position of the physical object and at least some of the portions different from the first position responsive to repositioning of the real world environment and the attached sensor due to body movement of the user, wherein the physical object has not moved in the real world environment between t0 and t1. Further, it includes causing display of a second virtual representation of the physical object at an actual second position.

Causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame. In one implementation, the common reference frame has a fixed point of reference and an initial orientation of axes, whereby the sensed second position is transformed to the actual second position.

In some implementations, the common reference frame is a world reference frame that does not change as the attached sensor is repositioned. In other implementations, the common reference frame is the second reference frame.

In some implementations, the transforming the first and second positions of the physical object into the common reference frame further includes applying an affine transformation.

The method includes determining the orientation of the physical object at the first position with respect to the first reference frame and causing the display of the physical object accordingly.

The method also includes determining the orientation of the physical object at the second position with respect to the second reference frame and causing the display of the physical object accordingly.

In some implementations, features in the images are used to track proximity of at least one physical object ahead of the user. The method includes using features in the images to distinguish among different approaching physical objects in the real world environment. The method also includes using features in the images to distinguish among different perspectives of a particular approaching physical object from varying vantage points of the forward facing camera. In some implementations, using features in the images to track proximity of at least one physical object ahead of the user further includes detecting at least one difference between the features between times t0 and t1 using at least one of a vector field flow and probabilistic flow.

At action 1940, responsive to detecting an approaching 3D constraint within a proximity threshold of the user using the virtual reality device, the virtual reality device is automatically signaled to generate an alert to a user of the virtual reality device. In one implementation, automatically generating the alert further includes generating data that represents the approaching physical object in a virtual environment of the HMVRD. In another implementation, automatically generating the alert further includes entering a pass through mode that interrupts the virtual reality experience and substitutes a live feed of the real world environment in a virtual environment of the HMVRD. In yet another implementation, automatically generating the alert further includes generating a physical warning feedback. In some implementations, the physical warning feedback is a haptic feedback. In other implementations, the physical warning feedback is an audio message generated by the HMVRD. In yet other implementations, the physical warning feedback is a visual feedback generated in a virtual environment of the HMVRD.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 20:
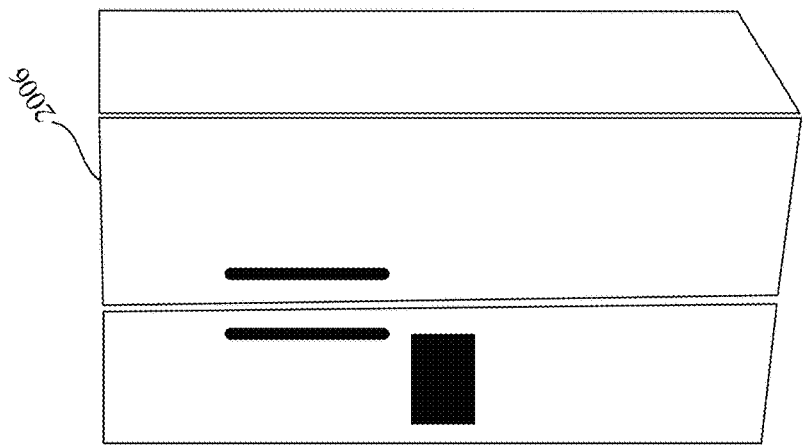
FIG. 20 illustrates one implementation of detecting potential collision with real world objects during a virtual experience created by a head mounted virtual reality device (HMVRD).
Figure 20:
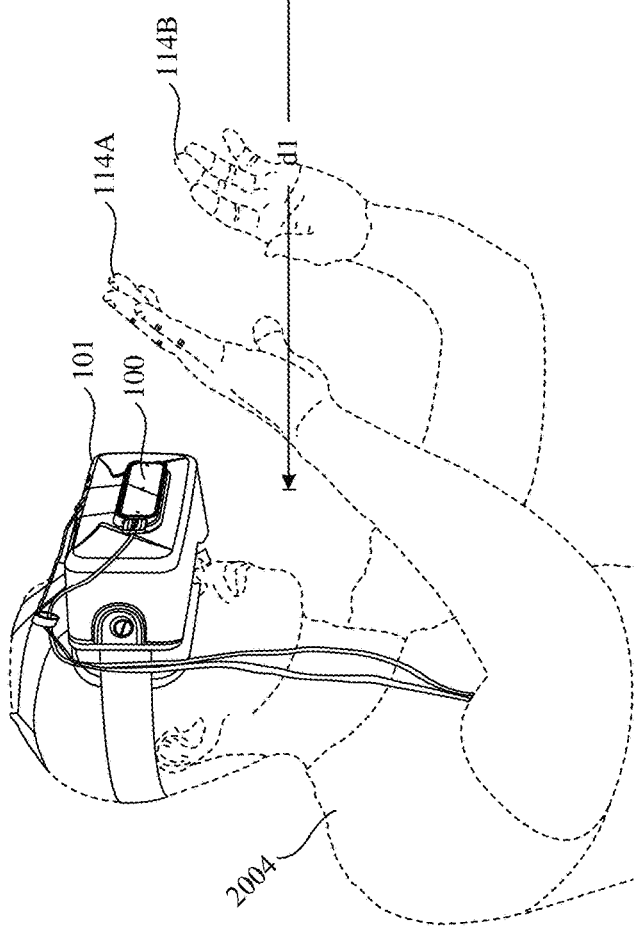

FIG. 20 illustrates one implementation of detecting potential collision with real world objects (e.g. refrigerator 2006) during a virtual experience 2000 created by a head mounted virtual reality device (HMVRD) 101. In FIG. 20, user 2004 is immersed in a virtual reality experience 2000 in which the user 2004 is manipulating virtual objects using hands 114A and 114B, as described in the discussion of FIG. 8. While immersed in virtual experience 2000 and interacting with virtual objects via various gestures (e.g. punch, kick, wave, clap, jump, throw, walk, run), user 2004 is not able to view the real world environment that includes a physical object 2006.

This digital immersion results in a situational awareness loss, which can cause the user 2004 to accidently collide with refrigerator 2006. The technology disclosed solves the technical problem of situational awareness loss in an immersive VR environment by detecting the refrigerator 2006 during the virtual experience 2000 when the refrigerator 2006 is within a proximity threshold "d1" of the user 2004 or HMVRD 101. The detection is performed by capturing a sequence of images of the physical object 2006. Features in the images corresponding to the physical object 2006 in the real world environment can be used to differentiate between different perspectives of the physical object 2006 at various temporal points, which can be in turn used to determine that the user 2004 is approaching the physical object 2006 or vice-versa in case of a mobile physical object. The features of the physical object 2006 are correlated across multiple images to determine change, which can be represented as a flow. The flow can be used to determine a relative motion between the user 2004 or HMVRD 101 and the physical object 2006 in the real world environment. In implementations, the flow can include a vector field, a probabilistic representation, other flow representations, or combinations thereof.

Figure 21:
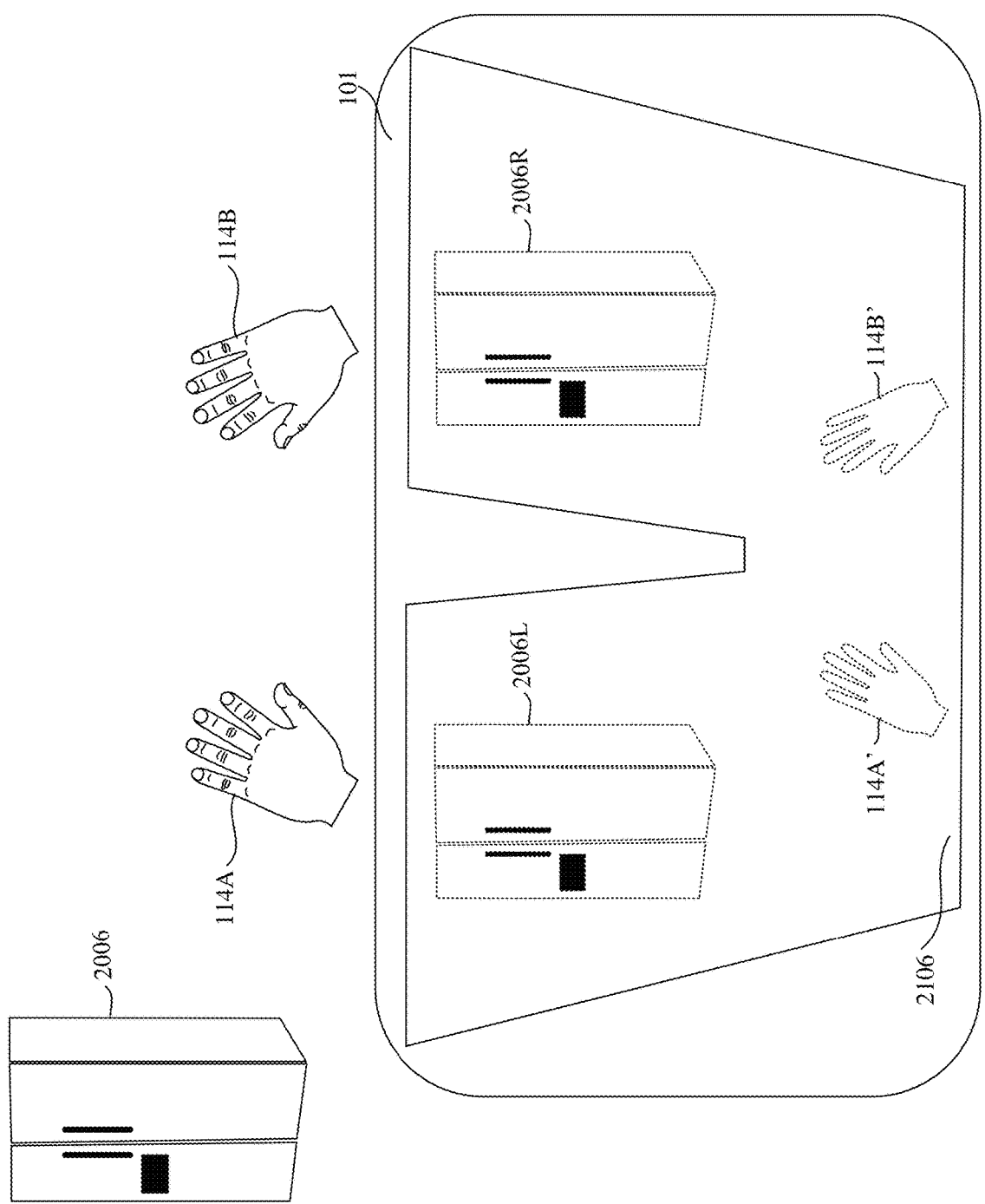
FIG. 21 depicts one implementation of automatically generating an alert to be injected into a virtual reality experience of a user of an HMVRD.

Another feature of the technology disclosed is to reduce the likelihood of the detected potential dangers by generating one or more alerts for the user. For example, in one implementation, the technology disclosed responds to reduce the danger by virtualizing the physical object 2006 posing the danger of collision into the virtual reality 2106 displayed to the user 2004 via the HMVRD 101. As shown in FIG. 21, virtual representations 2006R and 2006L of the refrigerator 2006 are injected into the virtual experience 2100 along with other virtual objects 114A' and 114B' for viewing by the user 2004.

Figure 22:
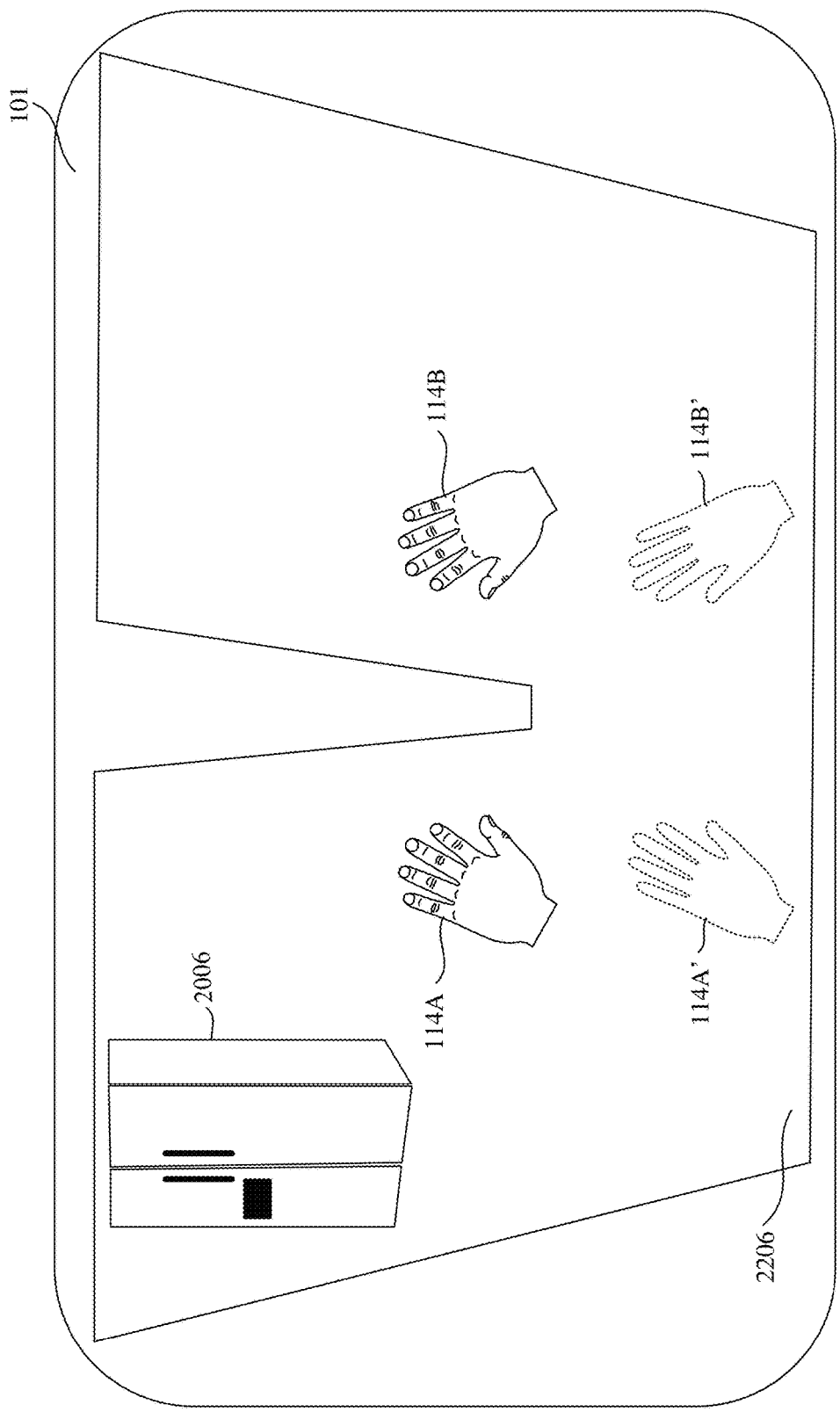
FIG. 22 is one implementation of automatically generating an alert to be injected into a virtual reality experience of a user of an HMVRD.

Another response to the potential danger includes entering a pass-through mode 2200 in which live video of the real world environment is displayed to the user 2004 instead of the virtual reality presentation 2206. As shown in FIG. 22, virtual reality 2206 displayed to the user 2004 via the HMVRD 101 becomes transparent to allow the user 2004 to view the actual real world physical objects, such as refrigerator 2006 and hands 114A and 114B. In other implementations, the pass-through mode 2200 incorporates the live video of the real world environment while continuing to maintain the virtual reality presentation 2206. For instance, the actual real world physical objects refrigerator 2006 and hands 114A and 114B are displayed (translucently or otherwise) to user 2004 in conjunction with the other virtual objects 114A' and 114B'.

A yet further response includes raising a warning to the user. As shown in FIG. 23, virtual reality 2306 displayed to the user 2004 via the HMVRD 101 generates a warning "PHYSICAL OBJECT APPROACHING" to alert the user 2004 of the potential collision during his or her virtual experience 2300.

In other implementations, the one or more responses can be combined and collectively triggered.

While the disclosed technology has been described with respect to specific implementations, one skilled in the art will recognize that numerous modifications are possible. The number, types and arrangement of cameras and sensors can be varied. The cameras' capabilities, including frame rate, spatial resolution, and intensity resolution, can also be varied as desired. The sensors' capabilities, including sensitively levels and calibration, can also be varied as desired. Light sources are optional and can be operated in continuous or pulsed mode. The systems described herein provide images and audio signals to facilitate tracking movement of an object, and this information can be used for numerous purposes, of which position and/or motion detection is just one among many possibilities.

Threshold cutoffs and other specific criteria for distinguishing object from background can be adapted for particular hardware and particular environments. Frequency filters and other specific criteria for distinguishing visual or audio signals from background noise can be adapted for particular cameras or sensors and particular devices. In some implementations, the system can be calibrated for a particular environment or application, e.g., by adjusting frequency filters, threshold criteria, and so on.

Any type of object can be the subject of motion capture using these techniques, and various aspects of the implementation can be optimized for a particular object. For example, the type and positions of cameras and/or other sensors can be selected based on the size of the object whose motion is to be captured, the space in which motion is to be captured, and/or the medium of the surface through which audio signals propagate. Analysis techniques in accordance with implementations of the technology disclosed can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the technology disclosed may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the disclosed technology has been described with respect to specific implementations, it will be appreciated that the disclosed technology is intended to cover all modifications and equivalents within the scope of the following claims.

What is claimed is:

1. A method of detecting an imminent collision with a physical object during a virtual reality experience by a user wearing a virtual reality device (VRD), the method including:
   using, by the VRD, a feature in an image of a sequence of captured images from a camera source to identify a proximity of a physical object that is blocked, by the VRD, from being actually viewed, wherein there is no virtual representation of the physical object;
   correlating, by the VRD, multiple images to detect relative motion of the physical object that is blocked by the VRD, from being viewed by the user as the user approaches;
   detecting that the user is approaching the physical object in dependence on (i) the identified proximity of the physical object and (ii) the detected relative motion of the physical object wherein detecting the relative motion involves a capability of detecting motion of the physical object; and
   responsive to detecting that the user is approaching the physical object, automatically generating an alert to be injected into a virtual reality experience of the user without generating data for display that is a replacement for the physical object in a virtual environment of the VRD.

2. The method of claim 1, further including:
   correlating multiple images to detect relative motion between the physical object approached and the user; and
   responsive to detecting the physical object approached within a proximity threshold, automatically generating an alert to be injected into a virtual reality experience of the user.

3. The method of claim 2, further including entering a pass through mode that interrupts the virtual reality experience and substitutes a live feed of a real world environment in the virtual environment of the VRD.

4. The method of claim 2, wherein the automatic generating of the alert further includes generating a physical warning feedback.

5. The method of claim 4, wherein the physical warning feedback is a haptic feedback.

6. The method of claim 4, wherein the physical warning feedback is an audio message generated by the VRD.

7. The method of claim 4, wherein the physical warning feedback is a visual feedback generated in a virtual environment of the VRD.

8. The method of claim 2, further including using a feature in the image to distinguish among different approaching physical objects in a real world environment.

9. The method of claim 2, further including using a feature in the image to distinguish among different perspectives of a particular approaching physical object from varying vantage points of a camera of the VRD.

10. The method of claim 1, wherein the proximity of the physical object is identified by tracking a motion of the physical object from a first position in a first reference frame to a second position in a second reference frame and transforming the first position and the second position to a common reference frame that does not change as the VRD is repositioned.

11. The method of claim 10, wherein the common reference frame comprises a world reference frame.

12. The method of claim 10, wherein the transforming of the first position and the second position of the physical object into the common reference frame further includes applying an affine transformation to at least one of the first reference frame and the second reference frame.

13. The method of claim 10, further including determining an orientation of the physical object at the first position with respect to the first reference frame and causing the display of the physical object accordingly.

14. The method of claim 10, further including determining an orientation of the physical object at the second position with respect to the second reference frame and causing the display of the physical object accordingly.

15. The method of claim 1, wherein the using of the feature further includes detecting at least one difference between the feature between a first time t0 and a second time t1 using at least one of:
   a vector field flow; and
   a probabilistic flow.

16. The method of claim 1, further including:
   creating a virtual three-dimensional (3D) map of a real world environment surrounding the user of the VRD, using the VRD and at least one camera coupled thereto;
   using features in some images of the sequence of images to detect a position or shape of the physical object and incorporating the physical object detected as 3D constraints in the virtual 3D map, wherein the physical object detected as 3D constraints represents an actual position or shape of the physical object; and responsive to detecting an approaching 3D constraint within a proximity threshold of the VRD, automatically signaling the VRD to generate the alert to the user.

17. The method of claim 16, wherein the automatic generating of the alert further includes at least one of:

generating data that represents the physical object approached;

entering a pass through mode that interrupts the virtual reality experience and substitutes a live feed of the real world environment in a virtual environment of the VRD; and generating a physical warning feedback, including:
a haptic feedback;
an audio message generated by the VRD; or
a visual feedback generated in a virtual environment of the VRD.

18. A non-transitory computer readable medium impressed with instructions for detecting an imminent collision with a physical object during a virtual reality experience by a user wearing a virtual reality device (VRD), the instructions when executed by one or more processors cause the processors to perform operations comprising:

using, by the VRD, a feature in an image of a sequence of captured images from a camera source to identify a proximity of a physical object that is blocked, by the VRD, from being actually viewed, wherein there is no virtual representation of the physical object;

correlating, by the VRD, multiple images to detect relative motion of the physical object that is blocked by the VRD, from being viewed by the user as the user approaches;

detecting that the user is approaching the physical object in dependence on (i) the identified proximity of the physical object and (ii) the detected relative motion of the physical object wherein detecting the relative motion involves a capability of detecting motion of the physical object; and responsive to detecting that the user is approaching the physical object, automatically generating an alert to be injected into a virtual reality experience of the user without generating data for display that is a replacement for the physical object in a virtual environment of the VRD.

19. A system comprising a non-transitory computer readable medium including instructions for detecting an imminent collision with a physical object during a virtual reality experience by a user wearing a virtual reality device (VRD), the instructions when executed by one or more processors cause the processors to perform operations comprising:

using, by the VRD, a feature in an image of a sequence of captured images from a camera source to identify a proximity of a physical object that is blocked, by the VRD, from being actually viewed, wherein there is no virtual representation of the physical object;

correlating, by the VRD, multiple images to detect relative motion of the physical object that is blocked by the VRD, from being viewed by the user as the user approaches;

detecting that the user is approaching the physical object in dependence on (i) the identified proximity of the physical object and (ii) the detected relative motion of the physical object wherein detecting the relative motion involves a capability of detecting motion of the physical object; and responsive to detecting that the user is approaching the physical object, automatically generating an alert to be injected into a virtual reality experience of the user without generating data for display that is a replacement for the physical object in a virtual environment of the VRD.

* * * * *